United States Patent
Dhinojwala et al.

(10) Patent No.: US 12,043,744 B2
(45) Date of Patent: Jul. 23, 2024

(54) STABILIZATION OF MELANIN-BASED SUPRAPARTICLES USING POLYMERIC GLUE

(71) Applicants: THE UNIVERSITY OF AKRON, Akron, OH (US); UNIVERSITEIT GENT, Ghent (BE); NORTHWESTERN UNIVERSITY, Evanston, IL (US)

(72) Inventors: Ali Dhinojwala, Akron, OH (US); Nathan Gianneschi, Wilmette, IL (US); Ming Xiao, Cambridge, MA (US); Ziying Hu, Evanston, IL (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 18/028,559

(22) PCT Filed: Sep. 27, 2021

(86) PCT No.: PCT/US2021/052194
§ 371 (c)(1),
(2) Date: Mar. 26, 2023

(87) PCT Pub. No.: WO2022/115145
PCT Pub. Date: Jun. 2, 2022

(65) Prior Publication Data
US 2023/0357575 A1    Nov. 9, 2023

Related U.S. Application Data

(60) Provisional application No. 63/118,532, filed on Nov. 25, 2020.

(51) Int. Cl.
| | | |
|---|---|---|
| *C09B 67/00* | (2006.01) | |
| *B01J 13/14* | (2006.01) | |
| *C08K 9/02* | (2006.01) | |
| *C09B 61/00* | (2006.01) | |
| *C09B 67/02* | (2006.01) | |
| *C09B 67/08* | (2006.01) | |
| *C09D 7/40* | (2018.01) | |
| *C09D 7/41* | (2018.01) | |
| *C09D 11/037* | (2014.01) | |
| *C09D 171/02* | (2006.01) | |

(52) U.S. Cl.
CPC ........... *C09B 67/0097* (2013.01); *B01J 13/14* (2013.01); *C08K 9/02* (2013.01); *C09B 61/00* (2013.01); *C09B 67/0007* (2013.01); *C09D 7/41* (2018.01); *C09D 7/67* (2018.01); *C09D 7/68* (2018.01); *C09D 7/69* (2018.01); *C09D 7/70* (2018.01); *C09D 11/037* (2013.01); *C09D 171/02* (2013.01); *C08K 2201/005* (2013.01); *C08K 2201/011* (2013.01)

(58) Field of Classification Search
CPC .............................. C09B 67/0097; C08K 9/02
See application file for complete search history.

(56) References Cited

U.S. PATENT DOCUMENTS

| | | | |
|---|---|---|---|
| 8,697,181 B2 * | 4/2014 | Biris ................. | A61K 49/1836 427/127 |
| 2019/0275491 A1 | 9/2019 | Dhinojwala et al. | |
| 2020/0113934 A1 | 4/2020 | Gianneschi et al. | |

OTHER PUBLICATIONS

Xiao et al., Bio-Inspired Structural Colors Produced via Self-Assembly of Synthetic Melanin Nanoparticles, ACS Nano, vol. 9, No. 5, May 4, 2015, pp. 5454-5460.
Xiao et al., Bioinspired bright noniridescent photonic melanin supra balls, Sciences Advances, vol. 3, Sep. 15, 2017, pp. 1-7.
ISR for application PCT/US2021/052194 dated Jan. 6, 2022.

* cited by examiner

*Primary Examiner* — Vickey Nerangis
(74) *Attorney, Agent, or Firm* — Renner, Kenner, Greive, Bobak, Taylor & Weber Co., LPA

(57) ABSTRACT

In various embodiments, the present invention is directed to a supraparticle for use in producing structural colors comprising a plurality of core/shell nanoparticles having a melanin or synthetic melanin core and a silica shell having a plurality of silanol groups on its outer surface and a poly(ethylene glycol) (PEG) crosslinker. In various embodiments, the structure of these crosslinked supra particles is reinforced by hydrogen bonds formed between the silanol groups on the core-shell nanoparticles and mechanical, solution phase, and dry state stability.

23 Claims, 17 Drawing Sheets"

Scale bar: 100 μm

STABILIZATION OF MELANIN-BASED SUPRAPARTICLES USING POLYMERIC GLUE

CROSS REFERENCE TO RELATED APPLICATIONS

This application claims priority to International application number PCT/US2021/052194 entitled Stabilization of Melanin-Based Supraparticles Using Polymeric Glue," filed Nov. 25, 2020, which claims the benefit of U.S. provisional patent application Ser. No. 63/118,532 entitled "Stabilization of Melanin-Based Supraparticles Using Polymeric Glue," filed Nov. 25, 2020, and which are both incorporated herein by reference in their entirety.

STATEMENT REGARDING FEDERALLY SPONSORED RESEARCH OR DEVELOPMENT SUPPORT

This invention was made with government support under contract number FA-955018-1-1042 awarded by United States Airforce Office of Scientific Research. The government has certain rights in the invention.

FIELD OF THE INVENTION

One or more embodiments of the present invention relates to improved supraparticles for use in structural colors. In certain embodiments, the present invention relates to synthetic melanin-based crosslinked supraparticles for use in structurally colored inks and other colorings.

BACKGROUND OF THE INVENTION

Supraparticles, a class of particle composed of smaller particular building blocks, have attracted broad attention for decades in various fields ranging from colloidal physics and chemistry and powder technology to pharmaceutical and food science. Applications include drug delivery, catalysis, gas storage and release, light emission, surface plasmon resonance, bimetallic monolith formation, as well as specific optical effects in structural coloration. Much of the work on supraparticles focuses on elucidating driving forces and kinetic mechanisms in the assembly or formation process and structure related properties and function. Relative to the individual building blocks, supraparticles typically exhibit significant differences in physiochemical properties. Structural colors stemming from supraparticles are a good example, as the supraparticles display vivid and intriguing optical effects while the building blocks, such as silica and carbon black nanoparticles, are monochrome.

Structurally colored supraparticles are of interest because of their extensive potential applications in displays, coatings, paints, and inks. These supraparticles may be prepared by one of several methods including capillary microfluidics, airbrush spraying techniques, evaporation of droplets deposited on substrates with hydrophobic surfaces, a two-step microwave assisted self-organization, and a porous glass membrane assisted emulsification technique. Generally, supraparticles with long-range ordered structures give rise to polychromatic patterns and bright angular-dependent (iridescent) colors, which are ascribed to diffraction at colloidal lattice planes. Quasi-ordered or short-range ordered suprastructures result in uniform and noniridescent colors, which derive from coherent scattering of the individual building blocks. However, the majority of these techniques are low yield.

Recently, a simple and fast vortex-assisted water/1-octanol reverse emulsion method has been used to fabricate supraparticles. This method allowed for the preparation of structurally colored supraparticles ranging from green to red using synthetic melanin with silica shell nanoparticles (SM@SiO$_2$NPs) as building blocks. (See, Xiao, M.; Hu, Z. Y.; Wang, Z.; Li, Y. W.; Tormo, A. D.; Le Thomas, N.; Wang, B.; Gianneschi, N. C.; Shawkey, M. D.; Dhinojwala, A. "Bioinspired bright noniridescent photonic melanin supraballs." *Science Advances* 2017, 3, e1701151, the disclosure of which is incorporated herein by reference in its entirety). Unfortunately, however, these materials are susceptible to structural damage leading to dim colors. Indeed, little has been shown to solve problems of structural weakness and instability, nor to improve the mechanical properties of structurally colored supraparticles. This failure is despite the fact that it is critically important to maintain supraparticle structure because their optical properties depend on the form of the assembly. One successful method to produce rigid, structurally colored supraparticles is ultraviolet-induced polymerization at the interface of supraparticles, forming a solid shell or capsule using a microfluidic device. However, this method significantly increases production complexity and has limited scalability.

Various strategies for locking nanoparticles together have been tried, including: (i) sintering the supraparticles above the glass transition of the building blocks, (ii) introducing a polyelectrolyte of the opposite charge to the nanoparticles, or (iii) modifying the nanoparticle surfaces with polyphenols and then crosslinking them on the surface of a large template particle using metal ions. However, these approaches present several drawbacks when working with structurally colored assemblies. These include limited scope of materials, high environmental sensitivity, and risk of blocking or distorting structural colors via introducing competing colors from the polyphenols and metal ions.

What is needed in the art is a durable supraparticle for use in providing structural color to inks and paints having improved mechanical and chemical durability and methods for making them.

SUMMARY OF THE INVENTION

In various embodiments, the present invention is directed to a durable supraparticle for use in providing structural color to inks and paints having improved mechanical and chemical durability and methods for making them. These supraparticles avoid the need for covalent chemistry, such as grafting crosslinkable compounds to the surface of the core-shell nanoparticles making forming the supraparticles, instead employing analogues of polyethylene glycol (PEG) and to reinforce already prevalent interactions between building blocks of supraparticles in self-assemblies. In general, the silica on the surface of melanin/silica core/shell nanoparticles strongly absorbs polyethylene glycol (PEG) and forms strong hydrogen bonds between the silanol groups (Si—OH) on the surface of the core/shell nanoparticles and the ether oxygens of the PEG crosslinker. It has been found that this hydrogen-bonding leads to supraparticles having a robust mechanical stability and improved performance in aqueous environments. Importantly, these supraparticles also been found to have improved dry state stability when deposited on a surface compared to corresponding supraparticles that do not comprise a poly(ethylene glycol) (PEG)

crosslinker when deposited on a corresponding surface and to work in conventional ink and paint media.

In a first aspect, the present invention is directed to a supraparticle for use in producing structural colors comprising: a plurality of core/shell nanoparticles having a melanin or synthetic melanin core and a silica shell, the silica shell having an outer surface comprising a plurality of silanol groups; and a poly(ethylene glycol) (PEG) crosslinker; wherein the core/shell nanoparticles are assembled to form a supraparticle having a structure and wherein the mechanical, solution phase, and dry state stability of the structure is reinforced by hydrogen bonds formed between the silanol groups of the plurality of core/shell nanoparticles and the poly(ethylene glycol) crosslinker. In some of these embodiments, the plurality of core/shell nanoparticles has a synthetic melanin core.

In one or more embodiments, the supraparticle of the present invention includes any one or more of the above referenced embodiments of the first aspect of the present invention the plurality of core/shell nanoparticles will have a diameter of from about 3 nm to about 1500 nm. In some of these embodiments, the core/shell nanoparticles have a synthetic melanin core having a diameter from about 50 nm to about 700 nm and a silica shell having a diameter from about 1 nm to about 120 nm.

In one or more embodiments, the supraparticle of the present invention includes any one or more of the above referenced embodiments of the first aspect of the present invention having a diameter of from about 3 µm to about 50 µm.

In one or more embodiments, the supraparticle of the present invention includes any one or more of the above referenced embodiments of the first aspect of the present invention wherein the poly(ethylene glycol) crosslinker comprises a linear, branched, or star PEG polymer. In some embodiments, the poly(ethylene glycol) crosslinker has a number average molecular weight ($M_n$) of from about 1000 Da to 10,000 Da. In some other embodiments, the poly(ethylene glycol) crosslinker is a 4-arm PEG polymer having a $M_n$ of from about 1000 Da to 10,000 Da.

In various embodiments, the supraparticle of the present invention includes any one or more of the above referenced embodiments of the first aspect of the present invention having improved mechanical stability when compared to corresponding supraparticles that do not comprise a poly(ethylene glycol) (PEG) crosslinker. In some embodiments, the supraparticle of the present invention includes any one or more of the above referenced embodiments of the first aspect of the present invention having improved resistance to compressive force when compared to corresponding supraparticles that do not comprise a poly(ethylene glycol) (PEG) crosslinker. In one or more embodiments, the supraparticle of the present invention includes any one or more of the above referenced embodiments of the first aspect of the present invention having improved solution phase stability when compared to corresponding supraparticles that do not comprise a poly(ethylene glycol) (PEG) crosslinker. In some embodiments, the supraparticle of the present invention includes any one or more of the above referenced embodiments of the first aspect of the present invention having improved dry state stability when deposited on a surface when compared to corresponding supraparticles that do not comprise a poly(ethylene glycol) (PEG) crosslinker when deposited on a corresponding surface.

In a second aspect, the present invention is directed to a method of making the supraparticles for use in producing structural colors as discussed above comprising the steps of: forming a plurality of core/shell nanoparticles having a melanin or synthetic melanin core and a silica shell, the silica shell having an outer surface comprising a plurality of silanol groups and suspending them in water or an aqueous solution; adding the aqueous suspension to an excess of a non-polar solvent or solvent solution and agitating to form a water-in-oil emulsion with the aqueous suspension in an inner phase and the non-polar solution or solvent forming an outer phase, wherein the core/shell nanoparticles in the inner phase will assemble to form supraparticles; dissolving a poly(ethylene glycol) crosslinker in a suitable solvent; collecting the supraparticles, adding the poly(ethylene glycol) crosslinker solution to the collected supraparticles, and incubating the mixture for from 1 to 24, whereby hydrogen bonds are formed between the ether groups in the poly (ethylene glycol) crosslinker and the silanol groups on the core/shell nanoparticles to produce the supraparticles discussed above. In some embodiments, the method further comprises collecting and washing the supraparticles in alcohol-based solvent to remove any unbound poly(ethylene glycol) crosslinker.

In some embodiments, the method of the present invention includes any one or more of the above referenced embodiments of the second aspect of the present invention wherein the plurality of core/shell nanoparticles have a mean diameter of from about 3 nm to about 1500 nm at their widest point. In some embodiments, the method of the present invention includes any one or more of the above referenced embodiments of the second aspect of the present invention wherein the plurality of core/shell nanoparticles have a mean diameter of from about 50 nm to about 700 nm at their widest point. In some embodiments, the method of the present invention includes any one or more of the above referenced embodiments of the second aspect of the present invention wherein the plurality of core/shell nanoparticles have a synthetic melanin core having a diameter from about 30 nm to about 700 nm and a silica shell having a diameter from about 1 nm to about 120 nm.

In some embodiments, the method of the present invention includes any one or more of the above referenced embodiments of the second aspect of the present invention wherein the non-polar solution or solvent forming an outer phase of the reverse emulsion is an amphiphilic long chain alcohol.

In some embodiments, the method of the present invention includes any one or more of the above referenced embodiments of the second aspect of the present invention wherein the poly(ethylene glycol) crosslinker is a linear, branched or star shaped poly(ethylene glycol) polymer having a $M_n$ of from about 1000 Da to 10,000 Da. In some of these embodiments, the poly(ethylene glycol) crosslinker is a 4-arm poly(ethylene glycol) polymer having a $M_n$ of from about 1000 Da to 10,000 Da.

In some embodiments, the method of the present invention includes any one or more of the above referenced embodiments of the second aspect of the present invention wherein the poly(ethylene glycol) crosslinker is added to the supraparticles at a mass ratio of poly(ethylene glycol) crosslinker to supraparticles of from about 4:15 to about 1:1. In some of these embodiments, the poly(ethylene glycol) crosslinker is added to the supraparticles at a mass ratio of poly(ethylene glycol) crosslinker to supraparticles of about 4:9.

In a third aspect, the present invention is directed to a colored ink or paint comprising the supraparticle discussed and/or made using the method described above.

BRIEF DESCRIPTION OF THE DRAWINGS

For a more complete understanding of the features and advantages of the present invention, reference is now made to the detailed description of the invention along with the accompanying figures in which:

(FIGS. 11A-D) 50 μm and (FIGS. 11E-H) 10 μm.

FIG. 13A is a graph showing the displacement-time setting applied for the force-displacement curves tests. The indenter probe approached and retracted from the supraparticles at a speed of 50 nm/s and was held for 2 s at 1000 nm. FIGS. 13B-D are typical force-displacement curves recorded during nanoindentation (the up right arrow-force loading, the down left arrow-force unloading) for noncrosslinked red supraparticles (FIG. 13B), red supraparticles crosslinked by linear PEG with molecular weight of 5000 (FIG. 13C), and red supraparticles crosslinked by 4-arm PEG with molecular weight of 2000 (FIG. 13D). FIG. 13E is a graph showing the average value of the maximum loading force (compressive stress) acquired from 10-15 supraparticles crosslinked by each PEG and the noncrosslinked supraparticles with an average diameter of 35±7 μm and FIG. 13F is a graph showing the percentage of supraparticles remaining intact after the indentation test for each group.

DETAILED DESCRIPTION OF THE ILLUSTRATIVE EMBODIMENTS

Figure 1:
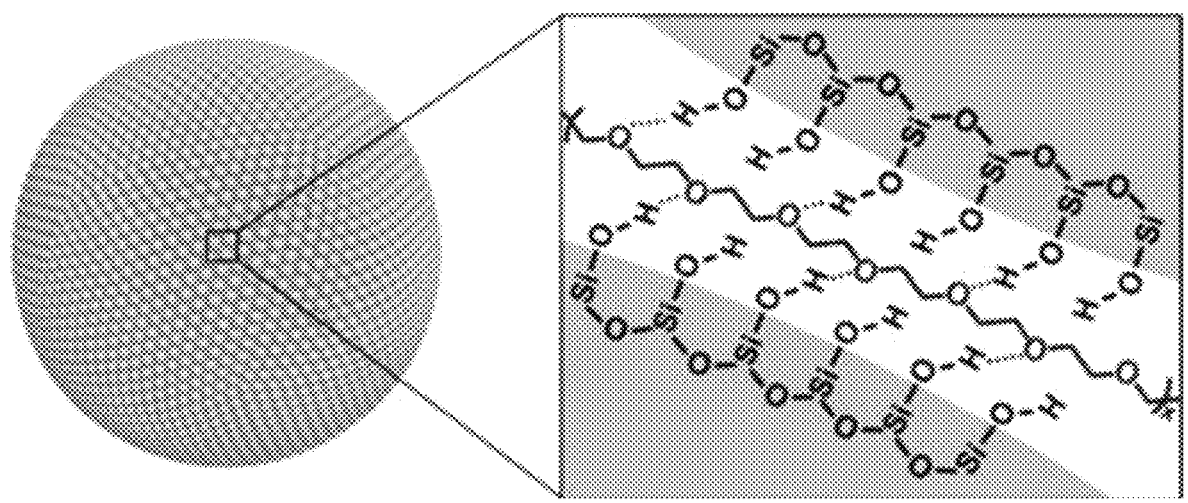
FIG. 1 is a schematic illustration of hydrogen-bond directed crosslinking between silanol groups on the silica surface of SM@SiO$_2$ NPs and an arbitrary PEG agent.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

In one or more embodiments, the present invention is directed to a more durable supraparticle for use in providing structural color to inks and paints. These supraparticles use analogues of polyethylene glycol (PEG) as a crosslinker to reinforce already prevalent interactions between building blocks of supraparticles in self-assemblies, without the need for covalent chemistry. In various embodiments, core/shell nanoparticles having a melanin or synthetic melanin core and a silica shell are formed into nanoparticles in a conventional manner. These core/shell nanoparticles are formed into supraparticles and then immersed in a solution containing a suitable PEG crosslinker. The PEG crosslinker coats and is adsorbed onto the supraparticles. As set forth above, it has been found that the silica on the surface of melanin/silica core/shell nanoparticles strongly absorbs polyethylene glycol (PEG) and forms strong hydrogen bonds between the silanol groups (Si—OH) on the surface of the core/shell nanoparticles and the ether oxygens of the PEG crosslinker. It has been found that this hydrogen-bonding leads to supraparticles having a robust mechanical stability and improved performance in aqueous environments. Importantly, the crosslinked supraparticles have been found to be stable on dry surfaces.

The following terms may have meanings ascribed to them below, unless specified otherwise. As used herein, the terms "comprising" "to comprise" and the like do not exclude the presence of further elements or steps in addition to those listed in a claim. Similarly, the terms "a," "an" or "the" before an element or feature does not exclude the presence of a plurality of these elements or features, unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term "about."

It should be also understood that the ranges provided herein are a shorthand for all of the values within the range and, further, that the individual range values presented herein can be combined to form additional non-disclosed ranges. For example, a range of 1 to 50 is understood to include any number, combination of numbers, or sub-range from the group consisting 1, 2, 3, 4, 5, 6, 7, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

The term "iridescent" as applied to structural color herein, refers to colors changes with the changes in the viewing angle of observer or sample directions with the respect to illuminating light direction; conversely the term "noniridescent" as applied to structural color refers to constant colors with the changes in the viewing angle of observer or sample directions with the respect to illuminating light direction.

Further, as used herein, the terms "core/shell nanoparticle," "core-shell nanoparticle," "SM@SiO$_2$ NPs," and "CSNP" are used to refer to a nano-scale particle having a synthetic melanin or natural melanin core having a high refractive index and a silica shell having a low refractive index. As used herein, the terms "refractive index" and "RI" are used interchangeably to refer to the ratio of the velocity of light in a vacuum to its velocity in a specified material. The term "high refractive index" or "high RI," as used herein, refer to a refractive index of 1.7 or higher, as measured by refractometer, and for these purposes, is generally from about 1.7 to about 2.0. In one or more embodiments, the refractive index may be calculated using an Abbe refractometer. As used herein, a "low-RI" is an RI of less than 1.7 as measured by refractometer. As used herein, the term "hydrophobic" refers to a material have a contact angle, greater than 90 degrees.

As used herein, the term "solution phase stability" as applied to the supraparticles of the present invention refers to the ability of the supraparticles to exist in a solvent or solvent solution without being damaged thereby. As used herein, the term "mechanical stability" as applied to the supraparticles of the present invention refers to the ability of the supraparticles to resist being damaged or deformed when acted on by a physical force and in particular, a compressive physical force. As used herein, the term "dry state stability" as applied to the supraparticles of the present invention refers to the stability of the supraparticles when they are in a dry state, and in particular, their stability when they have gone from being suspended in a liquid to being in a dry state. Finally, in various places herein, the supraparticles of the present invention will be compared to "a corresponding supraparticle" or "corresponding supraparticles" that do not include the PEG crosslinker discussed below. In these contexts, "a corresponding supraparticle" or "corresponding supraparticles" refers to a supraparticle (or supraparticles) having the same or essentially the same composition as the supraparticle of the present invention to which it is being compared, except that it does not comprise the PEG crosslinker. For these purposes, two supraparticles may be said to have "essentially the same composition" if their composition in nearly identical and the differences between them would not be considered significant by one of skill in the art.

All publications, patent applications, patents, and other references mentioned herein are expressly incorporated by reference in their entirety, which means that they should be read and considered by the reader as part of this text. That the document, reference, patent application, or patent cited in this text is not repeated in this text is merely for reasons of conciseness. In the case of conflict, the present disclosure, including definitions, will control. All technical and scientific terms used herein have the same meaning.

Further, any compositions or methods provided herein can be combined with one or more of any of the other compositions and methods provided herein. The fact that given features, elements or components are cited in different dependent claims does not exclude that at least some of these features, elements or components maybe used in combination together.

In a first aspect, the present invention is directed to a supraparticle for use in producing structural colors comprising core/shell nanoparticles having a melanin or synthetic melanin core and a silica shell having outer surface comprising silanol groups and a poly(ethylene glycol) (PEG) crosslinker. In these embodiments, the core/shell nanoparticles are assembled to form supraparticles and then covered with the poly(ethylene glycol) (PEG) crosslinker. Hydrogen bonds formed between the silanol groups on the surface of the core/shell nanoparticles and said poly(ethylene glycol) crosslinker tend to hold the core/shell nanoparticles together thereby reinforcing the structure of these supraparticles.

The core/shell nanoparticles are not particularly limited provided that they are capable of assembly into supraparticles and have a silica outer surface capable of forming hydrogen bonds with poly(ethylene glycol) (PEG) crosslinkers being used. While not required, some or all of the core/shell nanoparticles are preferably capable of forming supraparticles suitable for forming structural colors. In one or more embodiments, the core of the core/shell nanoparticles will comprise a natural melanin and may come from any suitable source, including, but not limited to bacteria, fungi, plants or animals. In some other embodiments, the core of the core/shell nanoparticles will comprise a synthetic melanin including, but not limited to, polydopamine (PDA), polydopamine-like polymers, and combinations thereof. In some embodiments, core/shell nanoparticles will have a synthetic melanin core. In some of these embodiments, the synthetic melanin core will comprise polydopamine.

The core/shell nanoparticles used to form the supraparticles of the present invention are generally nano scale in size. In various embodiments, the core/shell nanoparticles will have a melanin or synthetic melanin core with a diameter of from about 1 nm to about 500 nm, a silica coating having a thickness of from about 0.5 nm to about 500 nm, and an overall diameter of from about 3 to about 1500 nm. In various embodiments, the natural melanin or synthetic melanin core of the core-shell nanoparticles used in of the present invention will have a diameter of from about 50 nm to about 450 nm. In one or more embodiments, the natural melanin or synthetic melanin core of the core-shell nanoparticles used in of the present invention will have diameters from about 50 nm to about 400 nm, in other embodiments, from about 50 nm to about 300 nm, in other embodiments, from about 50 nm to about 200 nm, in other embodiments, from about 100 nm to about 500 nm, in other embodiments, from about 150 nm to about 500 nm, in other embodiments, from about 200 nm to about 500 nm, and in other embodiments, from about 300 nm to about 500 nm. In some embodiments, the melanin core of core-shell nanoparticles used in of the present invention will have a diameter of from about 120 nm to about 220 nm. Further, as will be apparent, melanin cores having diameters above 500 nm will lead to near IR reflectance and may be useful for thermal regulation.

In various embodiments, the silica shell of the core-shell nanoparticles used in of the present invention will have a thickness of from about 1 nm to about 400 nm. In one or more embodiments, the silica shells will have a thickness of from about 10 nm to about 400 nm, in other embodiments, from about 20 nm to about 400 nm, in other embodiments, from about 40 nm to about 400 nm, in other embodiments, from about 80 nm to about 400 nm, in other embodiments, from about 80 nm to about 400 nm, in other embodiments, from about 80 nm to about 400 nm, in other embodiments, from about 100 nm to about 400 nm, in other embodiments, from about 150 nm to about 400 nm, in other embodiments, from about 200 nm to about 400 nm, from about 300 nm to about 400 nm, in other embodiments, from about 0.5 nm to about 300 nm, in other embodiments, in other embodiments, from about 0.5 nm to about 200 nm, in other embodiments, from about 0.5 nm to about 100 nm, and in other embodiments, from about 0.5 nm to about 75 nm. In some embodiments, the silica shells will have a thickness from about 1 nm to about 80 nm. In some embodiments, the silica shells used in the present invention will have a thickness of from about 35 nm to about 70 nm.

In one or more embodiments, the ratio of the thickness of the silica shell to the overall diameter of the core-shell nanoparticles used in the present invention is from about 0:1 to about 1:1. In some of these embodiments, the ratio may be from about 0.2:1 to about 1:1, in other embodiments, from about 0.4:1 to about 1:1, in other embodiments, from about 0.6:6 to about 1:1, in other embodiments, from about 0.8:1 to about 1:1, in other embodiments, from about 0.9:1 to about 1:1, in other embodiments, from about 0.3:1 to about 0.9:1, and in other embodiments, from about 0.5:1 to about 0.8:1.

As set forth above, the overall diameter of the core-shell nanoparticles used in of the present invention can be as low as 3 nm or as high as 1500 nm but is preferably from about 50 to about 500 nm. In particular, it has been found that supraparticles made from core-shell nanoparticles with a larger diameter (generally over 500 nm) will produce wavelengths of light in the infra-red area of the spectrum and supraparticles made from CS-SMNPs with a smaller diameter (generally less than 50 nm) will produce wavelengths of light in the ultra-violet area of the spectrum.

In one or more embodiments, the overall diameters of the core-shell nanoparticles used to form the supraparticles of the present invention will be from about 10 nm to about 1000 nm. In one or more embodiments, the core-shell nanoparticles used in the present invention will have diameters from about 10 nm to about 800 nm, from about 10 nm to about 600 nm, from about 10 nm to about 500 nm, from about 10 nm to about 400 nm, from about 10 nm to about 300 nm, in other embodiments, from about 10 nm to about 200 nm, in other embodiments, from about 50 nm to about 1000 nm, in other embodiments, from about 100 nm to about 1000 nm, in other embodiments, from about 150 nm to about 1000 nm, in other embodiments, from about 200 nm to about 1000 nm, in other embodiments, from about 300 nm to about 1000 nm, in other embodiments, from about 400 nm to about 1000 nm, in other embodiments, from about 500 nm to about 1000 nm, in other embodiments, from about 600 nm to about 1000 nm, and in other embodiments, from about 800 nm to about 1000 nm. In some embodiments, the core-shell nanoparticles used in of the present invention will have overall diameters from about 50 nm to about 600 nm. In some embodiments, the core-shell nanoparticles used in of the present invention will have overall diameters from about 160 nm to about 300 nm.

In one or more embodiments, the core-shell nanoparticles used in of the present invention will have a refractive index (RI) of from about 1.40 to about 2.0, and preferably from about 1.4 to about 1.8. In some embodiments, the core-shell nanoparticles used in of the present invention will have a refractive index (RI) of from about 1.50 to about 2.0, in other embodiments, from about 1.6 to about 2.0, in other embodiments, from about 1.7 to about 2.0, in other embodiments, from about 1.4 to about 1.8, in other embodiments, from about 1.4 to about 1.7, in other embodiments, from about 1.4 to about 1.6.

In one or more embodiments, the core/shell nanoparticles may be as set forth in or U.S. Pat. No. 11,001,088 and/or U.S. Application Publication No. 2019/0275491, the disclosures of which are incorporated herein by reference in their entirety. As will be understood by those of skill in the art, at a given core-shell particle diameter, the structural color produced by the supraparticle may be tuned by altering the ratio of the core diameter to shell thickness. (See e.g., U.S. Pat. No. 11,001,088 and/or U.S. Application Publication No. 2019/0275491, the disclosures of which are incorporated herein by reference in their entirety.)

As will be appreciated by those of skill in the art, the color displayed by the core-shell nanoparticles used in the present invention is believed to be determined principally by the spacing and the regularity of the spacing between the melanin or synthetic melanin cores of the core-shell nanoparticles when they self-assemble into the supraparticles of the present invention. As will be apparent, in the tightly packed supraparticles of the present invention, the melanin cores are separated by the silica shell on their surfaces. In some embodiments, the color displayed by the supraparticle may be controlled by controlling the by the thickness of the shell of core-shell nanoparticles used to form the supraparticles, and with it the spacing of the core-shell nanoparticles in the supraparticles they form. For any given core size, it has been found that an increase in shell thickness results in an increase in the wavelength of light that will be displayed by supraparticles made using those core-shell nanoparticles. Conversely, it has been found that a decrease in shell thickness results in a decrease in the wavelength of light that will be displayed by supraparticles made using those core-shell nanoparticles. In this way, it is possible to, without undue experimentation, create supraparticles that display a desired structural color or UV/IR reflection.

Put another way, the color displayed by the supraparticles of the present invention may be controlled by changing the by the ratio of the core diameter to the shell thickness or the core diameter to the overall diameter. As will be appreciated, varying the ratio of the core diameter to the shell thickness or the core diameter to the overall diameter will have the effect of changing the spacing and the regularity of the spacing between the melanin particles and with it the color displayed. For any given overall CS-SMNP diameter, it has been found that an increase in ratio of the core diameter to the shell thickness or the core diameter to the overall diameter results in an increase in the wavelength of light that will be displayed by supraparticles made using those core-shell nanoparticles. Conversely, it has been found that a decrease in ratio of the core diameter to the shell thickness or the core diameter to the overall diameter results in a decrease in the wavelength of light that will be displayed by supraparticles made using those core-shell nanoparticles. In this way, it is possible to, without undue experimentation, create supraparticles that display a desired structural color.

In one or more other embodiments, the color displayed by the CS-SMNP may be controlled by varying their diameter while maintaining the same ratio of the core diameter to the shell thickness or the core diameter to the overall diameter. In these embodiments, an increase in the overall diameter of the core-shell nanoparticles results in an increase in the wavelength of light that will be displayed by supraparticles made using those CS-SMNPs and conversely, a decrease in the overall diameter results in a decrease in the wavelength of light that will be displayed by supraparticles made using those core-shell nanoparticles.

As set forth above, the supraparticles of the present invention further comprise a poly(ethylene glycol) (PEG) crosslinker. In various embodiments, the PEG crosslinker will be a linear, branched, or star PEG polymer having a number average ($M_n$) of from about 1,000 Da to 12,000 Da. In various embodiments, suitable linear, branched, or star PEG crosslinkers are commercially available from a wide variety of sources, including without limitation, Sigma Aldrich (Milwaukee, WI).

In some embodiments, the PEG crosslinker will be a linear PEG polymer having a number average ($M_n$) of from about 1,000 Da to 10,000 Da, in other embodiments, from about 2000 Da to about 10,000 Da, in other embodiments, from about 2000 Da to about 10,000 Da, in other embodiments, from about 4,000 to about 10,000 Da, in other embodiments, from about 6,000 Da to about 10,000 Da, in other embodiments, from about 1,000 Da to about 8,000 Da, in other embodiments, from about 1,000 Da to about 6,000 Da, in other embodiments, from about 1,000 Da to about 4000 Da, and in other embodiments, from about 1,000 Da to about 3,000 Da. In some embodiments the PEG crosslinker will be a linear PEG polymer having a $M_n$ of about 2,000 Da. In some embodiments the PEG crosslinker will be a linear PEG polymer having a $M_n$ of about 4,000 Da. In some embodiments the PEG crosslinker will be a linear PEG polymer having a $M_n$ of about 10,000 Da.

In one or more of these embodiments, the PEG crosslinker in a branched PEG having a $M_n$ of from about 1000 Da to 12,000 Da. In some embodiments, the PEG crosslinker will be a branched PEG polymer having a number average ($M_n$) of from about 1,000 Da to 10,000 Da, in other embodiments, from about 2000 Da to about 10,000 Da, in other embodiments, from about 2000 Da to about 10,000 Da, in other embodiments, from about 4,000 to about 10,000 Da, in other embodiments, from about 6,000 Da to about 10,000 Da, in other embodiments, from about 1,000 Da to about 8,000 Da, in other embodiments, from about 1,000 Da to about 6,000

Da, in other embodiments, from about 1,000 Da to about 4000 Da, and in other embodiments, from about 1,000 Da to about 3,000 Da.

In some embodiments, the PEG crosslinker in a star polymer having from 3 to 8 PEG arms extending from a central core. In some embodiments, the PEG crosslinker in a star polymer having 3, 4, 8 and/or higher order dendrimers. In some embodiments, the PEG crosslinker in a star polymer having from 3 to 7 in other embodiments, from about 3 to about 6, in other embodiments, from about 3 to about 5, in other embodiments, from about 3 to about 4, in other embodiments, from about 4 to about 8, in other embodiments, from about 5 to about 8, in other embodiments, from about 6 to about 8, and in other embodiments, from about 7 to about 8, PEG arms extending from a central core.

In one or more embodiments, the PEG crosslinker is a 4-arm PEG star polymer having a $M_n$ of from about 1000 Da to 12000 Da. In some embodiments, the PEG crosslinker will be a 4-arm PEG star polymer having a number average ($M_n$) of from about 1,000 Da to 10,000 Da, in other embodiments, from about 2000 Da to about 10,000 Da, in other embodiments, from about 2000 Da to about 10,000 Da, in other embodiments, from about 4,000 to about 10,000 Da, in other embodiments, from about 6,000 Da to about 10,000 Da, in other embodiments, from about 1,000 Da to about 8,000 Da, in other embodiments, from about 1,000 Da to about 6,000 Da, in other embodiments, from about 1,000 Da to about 4000 Da, and in other embodiments, from about 1,000 Da to about 3,000 Da. In some embodiments, the PEG crosslinker will be a 4-arm PEG star polymer having a number average ($M_n$) of about 2,000 Da. In some embodiments, the PEG crosslinker will be a 4-arm PEG star polymer having a number average ($M_n$) of about 4,000 Da. In some embodiments, the PEG crosslinker will be a 4-arm PEG star polymer having a number average ($M_n$) of about 10,000 Da. Suitable 4-arm PEG star polymer crosslinkers are commercially available from a wide variety of commercial sources.

As set forth above, the PEG crosslinkers interact with the outer surfaces of the core/shell nanoparticles forming the supraparticles largely as shown in FIG. 1. As can be seen, the structure of the supraparticles is reinforced by hydrogen bonds formed ether oxygens on the PEG crosslinker and silanol groups on the surfaces of adjacent core/shell nanoparticles. This system of hydrogen bonding tends to reinforce the structure of the supraparticles, providing improved mechanical and chemical properties compared to similar non-crosslinked supraparticles. In various embodiments, the supraparticles of the present invention have been found to be more stable in water and other non-polar solvents compared to comparable non-crosslinked supraparticles. (See FIGS. 2A-B). As set forth above, the supraparticles of the present invention have been found to be more stable dry on a surface relative to comparable non-crosslinked supraparticles.

In various embodiments, the supraparticles are solid and substantially spherical, with an overall diameter of from about 2 µm to about 150 µm at their widest point. In some embodiments, the supraparticles of the present invention will have an overall diameter at their widest point of from 5 µm to about 150 µm, in other embodiments, from about 10 µm to about 150 µm, in other embodiments, from about 30 µm to about 150 µm, in other embodiments, from about 50 µm to about 150 µm, in other embodiments, from about 80 µm to about 150 µm, in other embodiments, from about 2 µm to about 125 µm, in other embodiments, from about 2 µm to about 150 µm, in other embodiments, from about 2 µm to about 75 µm, and in other embodiments, from about 2 µm to about 50 µm. In some embodiments, the supraparticles of the present invention will have a diameter of from about 1 µm to about 50 µm.

As will be appreciated, the core-shell nanoparticles and supraparticles of the present invention are not luminescent, in that they do not generate light, let alone colored light. When applied to the supraparticles of the various embodiments of the present invention, the terms "display" and "produce" when used in reference to colors or wavelengths of light refers to colors or wavelengths of light produced when a structure scatters and redistributes white light and when applied to the core-shell nanoparticles of the various embodiments of the present invention, these terms refer to the color or wavelengths of light that would be "displayed" or "produced" by supraparticles prepared using those core-shell nanoparticles.

In various embodiments, the supraparticles of the present invention may include other nanoparticles in addition to the core-shell nanoparticles including, without limitation, natural melanin nanoparticles, synthetic melanin nanoparticles (SMNPs), latex, pure silica nanoparticles, polystyrene, polymethylmethacrylate, poly(N-isopropylacrylamide), carbon black, inorganic pigments, quantum dots, UV stabilizers, polymer nanoparticles, inorganic particles, solid silica nanoparticles, solid synthetic melanin nanoparticles, and combinations thereof.

In a second aspect, the present invention is directed to a method of making the supraparticle for use in producing structural colors described above generally comprising the steps: forming a plurality of core/shell nanoparticles as described above having a melanin or synthetic melanin core and a silica shell with an outer surface comprising a plurality of silanol groups, and suspending them in water or an aqueous solution; adding the aqueous suspension to an excess of a non-polar solvent or solvent combination; and vortexing or agitating it to form a water-in-oil emulsion with the aqueous suspension in an inner phase and the non-polar solution or solvent forming an outer phase, wherein the core/shell nanoparticles in said inner phase will assemble to form supraparticles; dissolving a poly(ethylene glycol) crosslinker in a suitable solvent; collecting the supraparticles formed, adding the poly(ethylene glycol) crosslinker solution of step C to said collected supraparticles, and incubating the mixture for from 1 to 24 hours, whereby hydrogen bonds are formed between the ether groups in the poly(ethylene glycol) crosslinker and the silanol groups on said core/shell nanoparticles to produce the supraparticles described above.

Figure 3A:
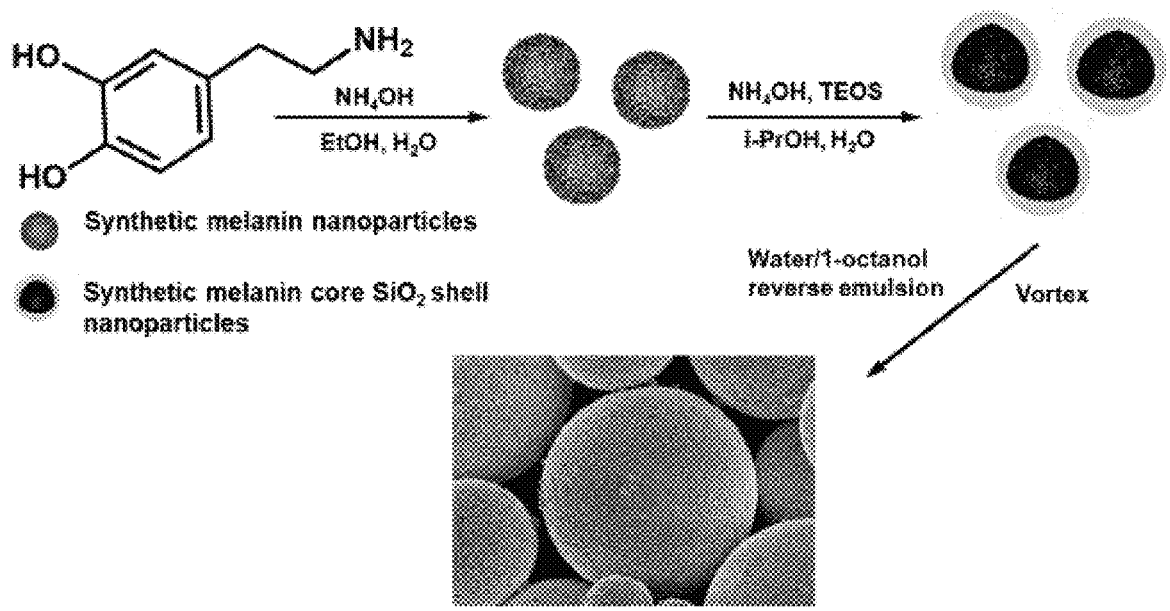
FIGS. 3A-B are a schematic diagram of the synthesis of synthetic melanin/silica core-shell nanoparticles (SM@SiO$_2$ NPs) and the assembly process to generate supraparticles using the reverse emulsion method (FIG. 3A) and a representative SEM image of red supraparticles formed from SM@SiO$_2$ NPs with a diameter of 262±10 nm (FIG. 3B). Scale bar: 2 μm

In various embodiments, the core/shell nanoparticles used to form the supraparticles will have the composition and core, shell, and overall dimensions described above. The method for making the core/shell nanoparticles is not particularly limited and any suitable method may be used. (See e.g., FIG. 3A). In some embodiments, the core/shell nanoparticles will have a natural melanin core. In one or more of these embodiments, the natural melanin core may be formed from particles extracted from bacteria, fungi, plants or animals by any suitable method known in the art for that purpose.

In some other embodiments, a synthetic melanin core may be used. In one or more embodiments, the synthetic melanin will comprise polydopamine and may be prepared by the oxidative polymerization of dopamine in the presence of a base as set forth in U.S. Application Publication No. 2019/0275491 or M. Xiao, Y. Li, M. C. Allen, D. D. Deheyn, X. Yue, J. Zhao, N. C. Gianneschi, M. D. Shawkey, A. Dhinojwala, "Bio inspired structural colors produced via self-assembly of synthetic melanin nanoparticles." *ACS Nano* 9, 5454-5460 (2015), the disclosures of which are incorporated herein by reference in their entirety. In this process, under alkaline conditions, in an alcohol type solvent, such as ethanol or isopropanol, and water or purified water, such as Milli-Q water, dopamine hydrochloride ($C_8H_{11}NO_2 \cdot HCl$) is added with vigorous stirring to form the synthetic melanin nanoparticles (SMNPs) that form the core of the core/shell nanoparticles. The size of SMNPs can be tuned by changing the amount of either dopamine hydrochloride or $NH_4OH$. The SMNPs may be purified using a centrifuge and then dispersed in Milli-Q water. After repeating the purification procedure four times, the as-prepared SMNPs are again dispersed in Milli-Q water at 3.7 mg/mL for the subsequent coating step.

Similarly, the silica shell may be applied to the melanin or synthetic melanin core using any suitable method known in the art for that purpose but is preferable applied using a modified Stöber method. (See, Stöber, W.; Fink, A.; Bohn, E. J. Controlled growth of monodisperse silica spheres in the micron size range. J. Colloid Interface Sci. 1968, 26, 62-68, the disclosure of which is incorporated herein by reference. In one or more of these embodiments, the silica shell may be applied to the SMNPs by first mixing the SMNPs suspension as described above in isopropanol, or another alcohol-based solvent followed by a base such as $NH_4OH$. Next, a silica precursor, like tetraethyl orthosilicate is added dropwise into the mixture. Core/shell particles with different shell thicknesses/diameters can be achieved by simply changing the reaction time. The core-shell particles may then be purified with water by centrifugation (5,000-10,000 rpm for 6 min) and suspended in water or an aqueous solution. (See e.g., FIG. 3A)

As set forth above, the core/shell nanoparticles may be formed into supraparticles by any known method but are preferably formed using a water-in-oil reverse emulsion. On one or more embodiments, the supraparticles may be formed using the water-in-oil reverse emulsion method shown in U.S. Application Publication No. 2019/0275491 (see also, International Application Publication WO 2018/098,232 A1), or Xiao, M.; Hu, Z. Y.; Wang, Z.; Li, Y. W.; Tormo, A. D.; Le Thomas, N.; Wang, B.; Gianneschi, N. C.; Shawkey, M. D.; Dhinojwala, A. Bioinspired bright noniridescent photonic melanin supraballs. *Science Advances* 2017, 3, e1701151, the disclosures of which are incorporated herein by reference in their entirety. (See e.g., FIG. 3A).

In these embodiments, the core/shell nanoparticles are first suspended in water or an aqueous solution, as set forth above, and combined with an excess of the liquid material selected for the oil phase in a suitable container, preferably having hydrophobic interior walls to prevent the water droplets in the emulsion, once formed, from sticking to the sides of the container and being broken apart. As set forth above, the term "hydrophobic" is used herein to refers to a material having a contact angle greater than 90 degrees. Any container or reaction vessel having a sufficiently hydrophobic interior surfaces and/or any method known in the art for forming a hydrophobic coating on the internal surfaces of a container or vessel may be used. In one or more embodiment, a hydrophobic coating may be applied to the internal surfaces of a container or vessel as set forth in US 2019/0275491 (the disclosure of which is incorporated herein by reference in its entirety) may be used. As will be apparent, the mixture will form a 2-phase system, in which the aqueous nanoparticle suspension will form a first (water) phase and the liquid material selected for the oil phase forming a second (oil) phase.

In one or more embodiment, the liquid material selected for the second (oil) phase will be a solvent, such as 1-octanol, that is at least somewhat amphiphilic. In one or more embodiments, these liquid materials are not sufficiently polar to dissolve into the aqueous phase but are sufficiently polar that they will absorb at least some water. 1-octanol, for example, has a larger polar octane group that prevents it from diffusing into the inner water phase of the emulsion, but is sufficiently non-polar due to its terminal hydroxyl group to permit at least some water to diffuse into it. In various embodiments, second (oil) phase will comprise an amphiphilic long chain alcohol. As used herein, an amphiphilic long chain alcohol refers to an alcohol comprising a hydroxyl group bonded to a carbon chain of at least 8 carbon atoms in length. In one or more embodiment, the amphiphilic long chain alcohol will be a primary alcohol of a linear alkane of at least 8 carbon atoms in length.

In one or more embodiment, the liquid material used to form the oil phase will have an interfacial energy with water of from about 2 $mJ/m^2$ to about 55 $mJ/m^2$, and preferably from 5 $mJ/m^2$ to about 15 $mJ/m^2$. In some embodiments, the liquid material used to form the oil phase will have an interfacial energy with water of from about 2 $mJ/m^2$ to about 45 $mJ/m^2$, in other embodiments, from about 2 $mJ/m^2$ to about 35 $mJ/m^2$, in other embodiments, from about 2 $mJ/m^2$ to about 20 $mJ/m^2$, in other embodiments, from about 5 $mJ/m^2$ to about 55 $mJ/m^2$, in other embodiments, from about 10 $mJ/m^2$ to about 55 $mJ/m^2$, in other embodiments, from about 15 $mJ/m^2$ to about 55 $mJ/m^2$, and in other embodiments, from about 8 $mJ/m^2$ to about 10 $mJ/m^2$. Suitable materials for use as the second (oil) phase may include, without limitation, primary alcohols, secondary alcohols, tertiary alcohols, anilines, 1-octanol, pentanol, hexanol, heptanol, phenols, 1-decanol, or a combination thereof, and combinations thereof. In various embodiments, the oil phase comprises 1-octanol.

As set forth above, the aqueous nanoparticle suspension is added to an excess of the second (oil) phase. Due to the limited solubility of water into the oil phase, the volume of the material used for the second (oil) phase should be sufficient relative to the volume of the aqueous phase to ensure that it has sufficient solubility to allow substantially all of the water in the aqueous phase to migrate into the oil phase once the emulsion has been formed. Accordingly, an "excess" of the of the second (oil) phase refers to a quantity that is at least sufficient relative to the volume of the aqueous phase to ensure that it has sufficient solubility to allow substantially all of the water in the aqueous phase to migrate into the oil phase once the emulsion has been formed. As will be apparent, the volume-to-volume ratio of the oil phase to the aqueous phase in the emulsion will depend upon the capability of the oil phase material chosen to absorb water. The volume of material in the oil phase should be sufficient to accommodate, i.e., absorb, all of the water in the aqueous droplets in the emulsion in order to allow the core-shell nanoparticles to self-assemble into supraparticles. One of ordinary skill in the art will be able to determine the volume of material to use in the oil phase (relative to the volume of the aqueous phase) necessary to form the supraparticles of the present invention without undue experimentation.

To form the water-in-oil reverse emulsion, the two-phase system described above is vortexed or agitated to form a water-in-oil reverse emulsion with the aqueous core/shell nanoparticle suspension in an inner (water) phase and the amphiphilic non-polar solution or solvent forming an outer (oil) phase. The reverse emulsion may be formed by any conventional method. Suitable methods may include, but are not limited to, a digital vortex, homogenizer, and/or mechanical/magnetic stirring. The force applied to form the emulsion should be enough to form the emulsion but not enough to cause the supraparticles being formed to break apart. In one or more embodiments, the reverse emulsion is formed by a digital vortex at a shaking speed of from about 1400 rpm to about 1800 rpm for from about 2 min to about 5 min. In one or more embodiments, the reverse emulsion is formed by a digital vortex at a shaking speed of 1600 rpm for 2 min.

No surfactant molecules are necessary to stabilize the emulsion, and the transient stable emulsion droplets may be formed upon shear mixing. While in some embodiments of the present invention a surfactant or other emulsification aid may be used, care must be taken to ensure that the surfactant or other emulsification aid chosen does not prevent or substantially hinder passage of the water molecules from the aqueous phase into the continuous (oil) phase.

As will be apparent, the emulsion will comprise numerous droplets of the aqueous phase containing the core-shell nanoparticles dispersed in the continuous oil phase. Once an emulsion having droplets of the desired size has been formed, however, the digital vortex or other mechanism used to create the emulsion may be slowed to allow the water in the aqueous phase to be more efficiently absorbed into the oil phase, without risking damage to the forming supraparticles. As the water is slowly drawn out of the droplets in the aqueous phase, the core-shell nanoparticles are drawn together until they self-assemble to form a well-ordered supraparticles, as described above. In some embodiments, the shaking speed of the digital vortex is reduced to a speed of from about 700 rpm to about 1300 rpm for from about 2 to about 5 minutes to allow the supraparticles to be formed by the shrinking of the aqueous droplets as the water contained therein dissolves into the oil phase. In some embodiments, the shaking speed of the digital vortex is reduced to a speed of about 1000 rpm for about 3 minutes to allow the supraparticles to form. After agitation is complete, the supraparticles will sink to the bottom of the reaction vessel.

Finally, the supraparticles are collected and mixed with a solution containing the PEG crosslinker. In one or more embodiments, the PEG crosslinker is prepared by dissolving a suitable PEG polymer in a suitable solvent. The solvent used to dissolve the PEG polymer is not particularly limited provided, of course, that it is a solvent for the PEG polymer at the concentrations, temperatures, and pressure being used and will not damage the supraparticles. Suitable solvents may include, without limitation, methanol, other alcohols, and combinations thereof. One of ordinary skill in the art will be able to select a suitable solvent without undue experimentation.

Once the supraparticles have been formed, they may be collected and dried to a powder by any means known in the art for that purpose. In some embodiments, the supraparticles may be collected by simply decanting off the supernatant to concentrate the supraparticles, which will have settled at the bottom of the vessel. In some other embodiments the supraparticles may be concentrated and collected by filtration or centrifugation. The supraparticles may then be dried to a powder by any suitable means including, but not limited to, evaporation or lyophilization. In some of these embodiments, the evaporation time may be reduced by means of heat or a reduced pressure. One of ordinary skill in the art will be able to collect the supraparticles without undue experimentation.

The supraparticles are then mixed with the PEG crosslinker solution. As set forth above, the PEG crosslinker will coat the outside and be pulled onto the supraparticles. In some embodiments, the PEG solution is added to the supraparticles at mass ratio of PEG to supraparticles of 4:15 to about 1:1. In some embodiments, the PEG solution is added to the supraparticles at mass ratio of PEG to supraparticles of 6:15 to about 1:1, in other embodiments, from about 8:15 to about 1:1, in other embodiments, from about 10:15 to about 1:1, in other embodiments, from about 12:15 to about 1:1, in other embodiments, from about 6:15 to about 13:15, in other embodiments, from about 6:15 to about 11:15, in other embodiments, from about 6:15 to about 10:15, in other embodiments, from about 6:15 to about 9:15, and in other embodiments, from about 6:15 to about 8:15. In some embodiments, the PEG solution is added to the supraparticles at mass ratio of PEG to supraparticles of 4:9.

Next, the supraparticles are incubated by allowing them to rest at ambient temperature and pressure for from 1 to 24 hours to allow the PEG to bond with the supraparticles. No additional heat is required to incubate the supraparticles.

The supraparticles are then rinsed to remove any loose (i.e., unattached) PEG. The supraparticles may be rinsed using any suitable method provided that the method chosen does not damage the supraparticles of remove the PEG adhered thereto. In some embodiments, the crosslinked supraparticles are suspended in methanol, gently shaken, and allowed to settle. The free PEG containing supernatant is then removed and the process repeated until substantially all of the free PEG has been removed, to provide the finished supraparticles.

Advantageously, the reverse emulsion and PEG coating techniques of the claimed method are relatively simple and core-shell nanoparticles and/or supraparticles of different types can be prepared and stored in advance, allowing for facile scale-up to produce a wide variety of different structural colors at scale. Another advantage is that unlike some prior art systems, it is not necessary to graft polymers or add other materials to the outsides of the core-shell nanoparticles before formation of the supraparticles to allow or facilitate crosslinking. The only additional step (adding the PEG crosslinker solution) takes place after formation of the of core-shell nanoparticles into supraparticles.

In another aspect, the present invention is directed to an ink or paint made using the supraparticles of the present invention. As set forth above, crosslinking the supraparticles with a PEG crosslinker provides supraparticles having enhanced stability in aqueous solvents and in the dry state. Notably, it has also been found that the compressive force resistance of supraparticles crosslinked by 4-arm PEG2k is at least 10-fold greater than that of the noncrosslinked analogue. With the enhanced stability of photonic supraparticles both in solvents and dry state provided by the supraparticles of the present invention, it is possible to directly blend the supraparticles and deploy them as inks or paints with standard media. Advantageously, the supraparticles of the present invention may be used with conventional media and binders in the same way as conventional pigments to provide structural color on a wide variety of surfaces. It is believed that this type of colorful structural ink has the potential to replace molecular and metal-based pigments commonly used in applications where human contact is likely, for example in cosmetic formulations.

Experimental

To more fully illustrate and reduce the invention to practice, a full-spectrum of supraparticles from were prepared from SM@SiO$_2$ NPs, using an easily scalable vortex-assisted water/1-octanol reverse emulsion method and a hydrogen-bonded crosslink approach that not only enhances the stability of supraparticles composed of SM@SiO$_2$ NPs in an aqueous environment, but also strengthens their mechanical properties as dry powders. Moreover, the effects of molecular weight and topology of PEGs on supraparticle compressive strength and how this enhanced mechanical stability further enables the application of structurally colored SM@SiO$_2$ NPs as aqueous inks were also investigated.

Figure 3B:
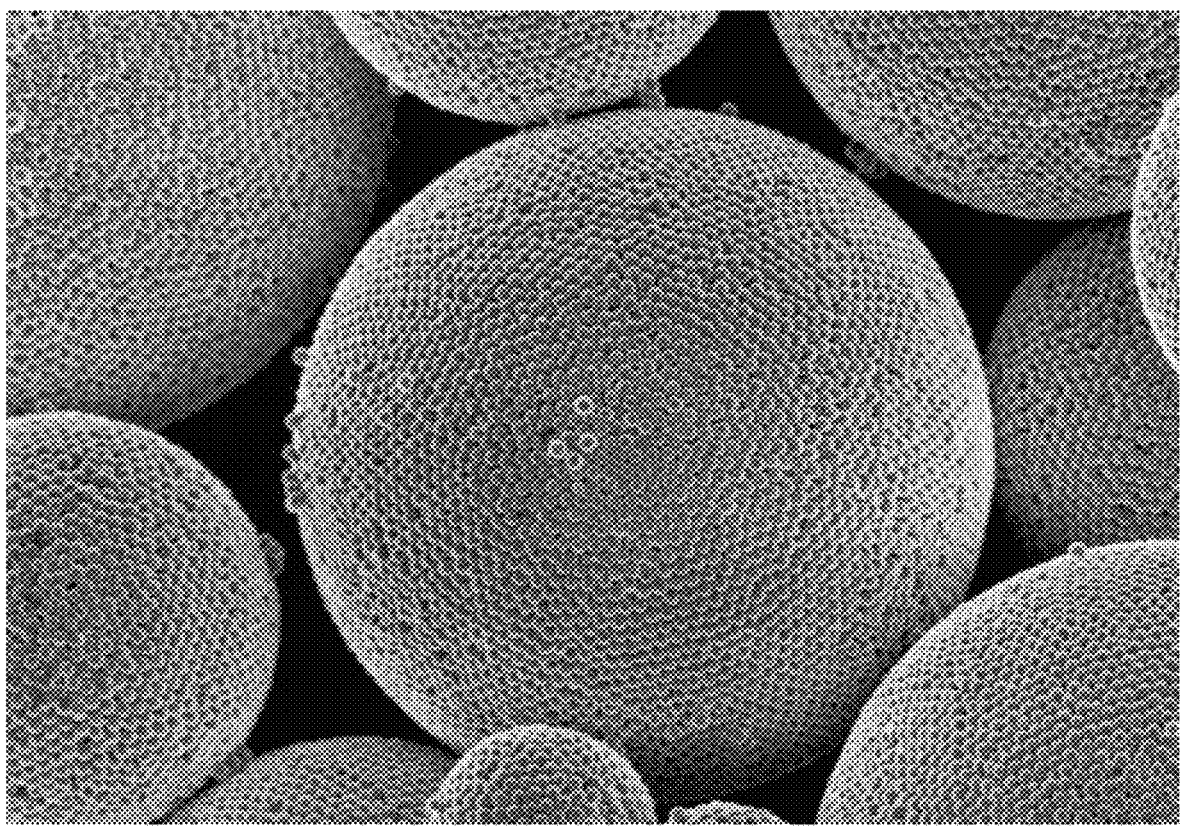
Figure 4A:
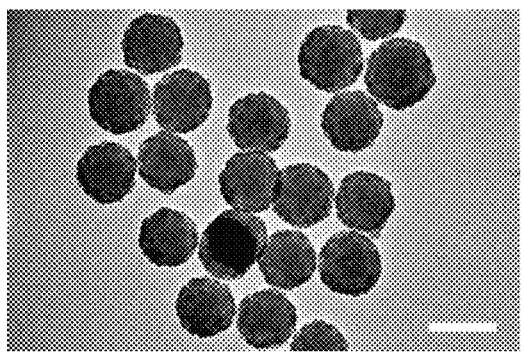
FIGS. 4A-D are transmission electron microscopy (TEM) images of SM@SiO$_2$ NPs with the same core (SMNP core is 161±13 nm; see FIGS. 7A-B, below) and different shell thicknesses which endow the supraparticles with color from blue to red. Total particle diameters: 183±9 (FIG. 4A), 200±10 (FIG. 4B), 218±10 (FIG. 4C), and 262±10 nm (FIG. 4D). Average values and standard deviation of diameters were for 50 NPs. Scale bars: 200 nm
Figure 4B:
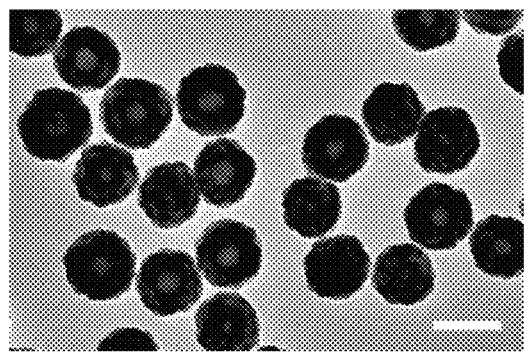
Figure 4C:
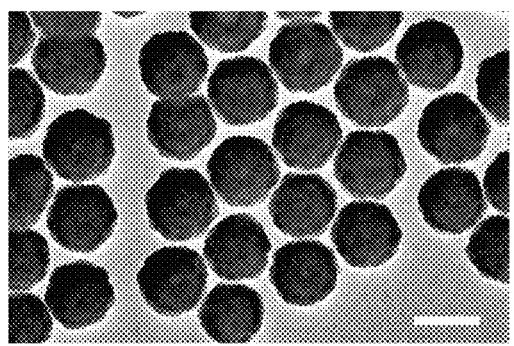
Figure 4D:
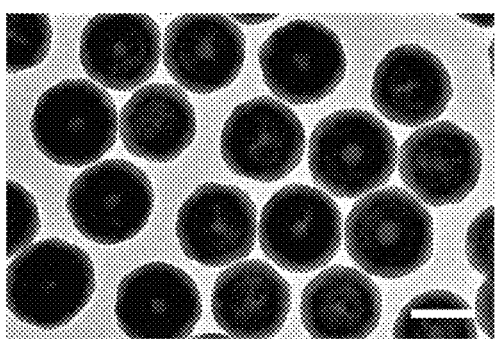
Figure 5A:
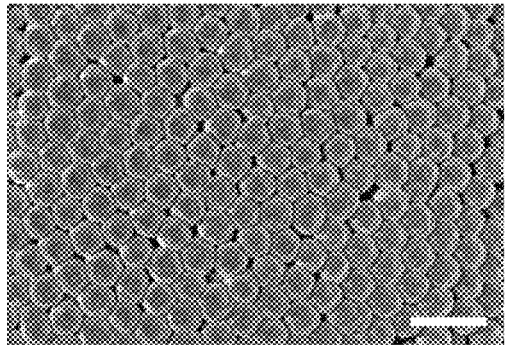
FIGS. 5A-D are SEM images of the surface morphology of individual supraparticles assembled from SM@SiO$_2$ NPs shown in the panels above (FIGS. 4A-D, respectively). Scale bars: 500 nm
Figure 5B:
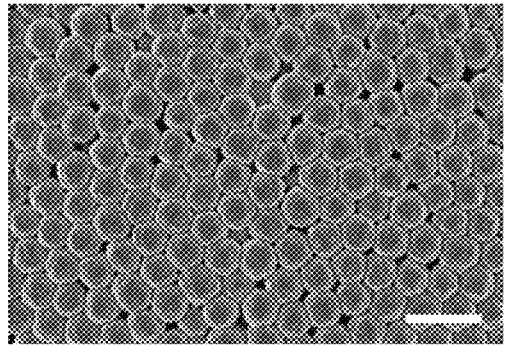
Figure 5C:
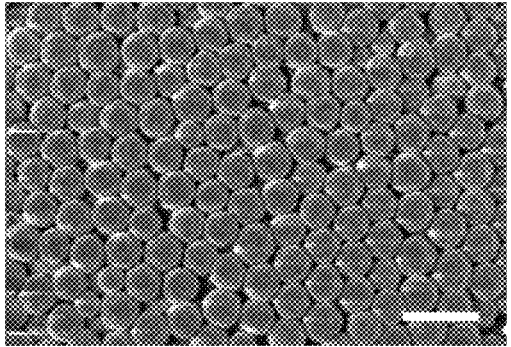
Figure 5D:
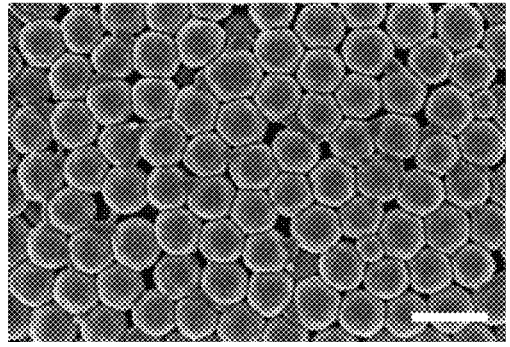
Figure 6A:
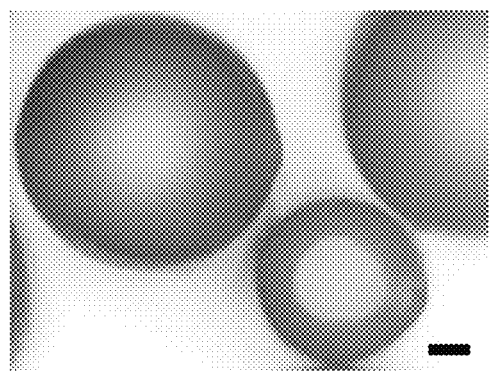
FIGS. 6A-D are optical images of photonic supraparticles shown in the panels above (FIGS. 5A-D, respectively). Scale bars: 10 μm.
Figure 6B:
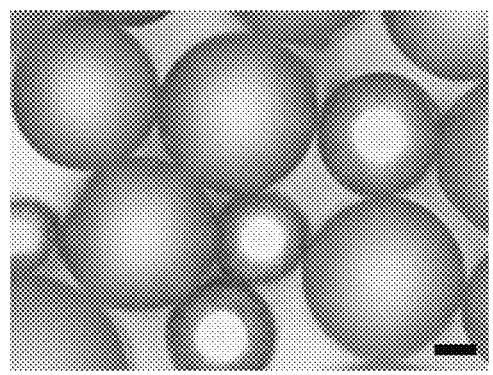
Figure 6C:
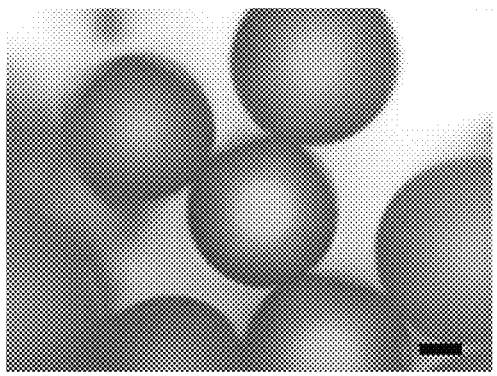
Figure 6D:
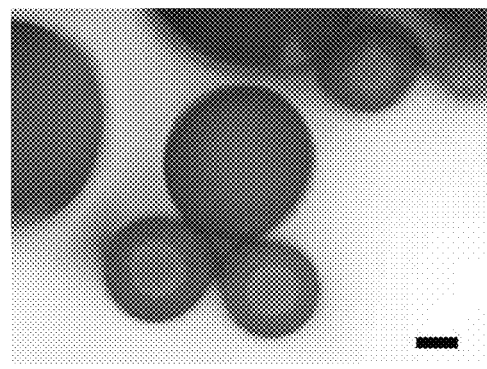
Figure 7A:
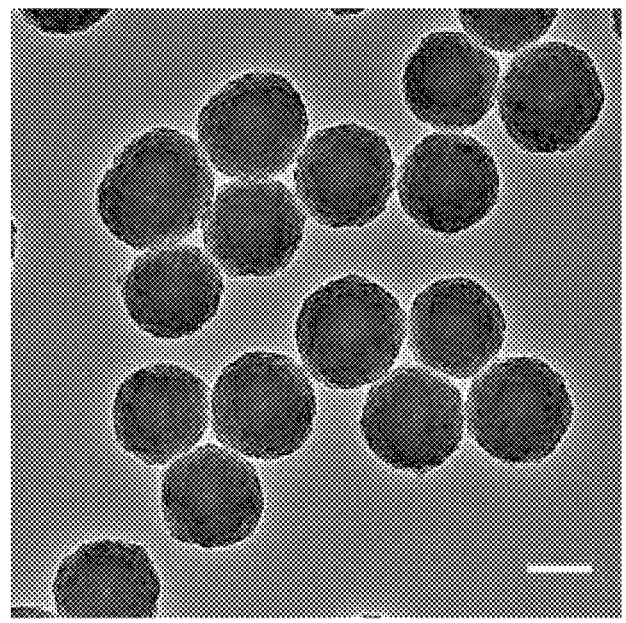
FIGS. 7A-B are a transmission electron microscopy (TEM) image of synthetic melanin nanoparticles (SMNPs) showing the morphology of synthetic melanin nanoparticles (SMNPs) (Scale bar: 100 nm.) (FIG. A) and a graph showing the kinetics of silica shell growth on the surface of the SMNPs (FIG. B). The diameter increases of synthetic melanin core silica shell nanoparticles (SM@SiO$_2$ NPs) along with reaction time.
Figure 7B:
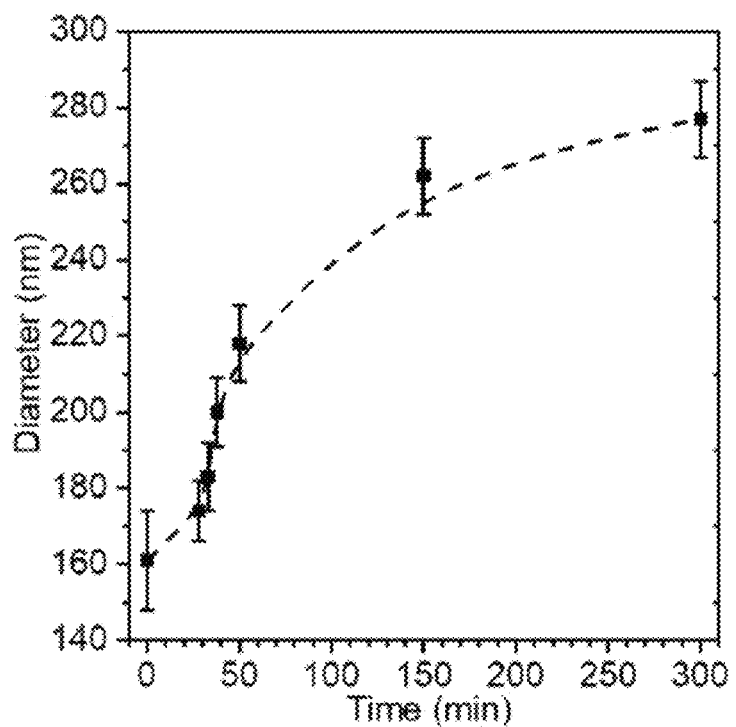

Synthetic melanin with silica shell nanoparticles (SM@SiO$_2$ NPs) were prepared and assembled into supraparticles (See, FIGS. 3A-B, 4A-D, 5A-D, 6A-D). Previously, it was found that synthetic melanin nanoparticles (SMNPs, step 1, FIG. 3A-B) have a high refractive index (RI~1.74) and broad absorption across the visible spectra, while silica has a low RI (~1.45) and negligible absorption. The combination of these two materials endows supraparticles with high reflectance and bright colors, See, Xiao, M.; Hu, Z. Y.; Wang, Z.; Li, Y. W.; Tormo, A. D.; Le Thomas, N.; Wang, B.; Gianneschi, N. C.; Shawkey, M. D.; Dhinojwala, A. Bioinspired bright noniridescent photonic melanin supraballs. *Science Advances* 2017, 3, e1701151, the disclosure of which is incorporated herein by reference in its entirety.

Figure 8:
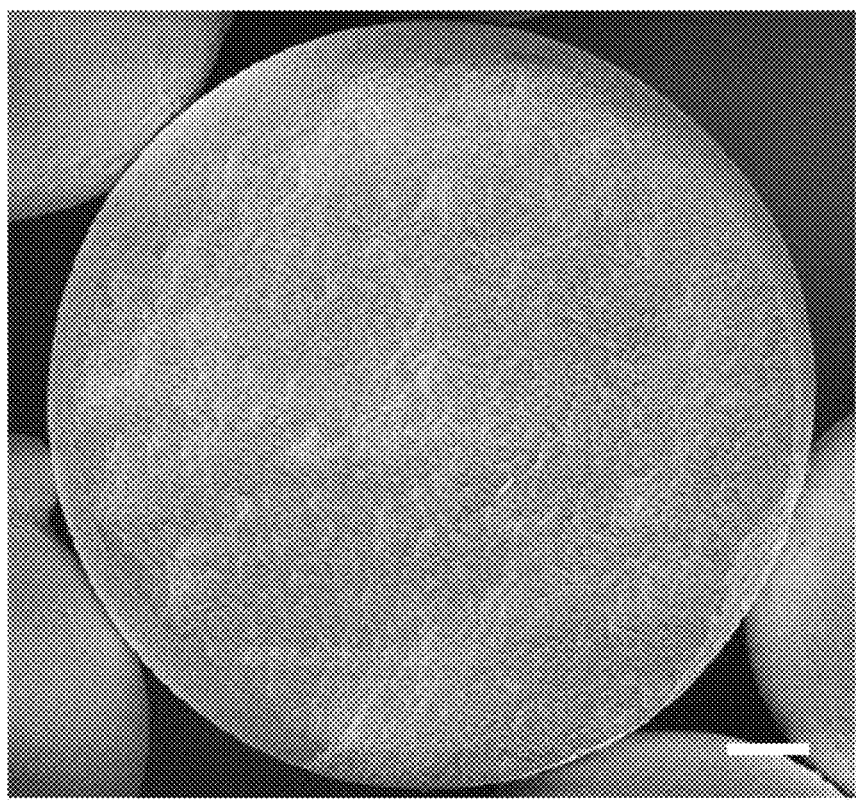
FIG. 8 is a scanning electron microscope (SEM) image of supraparticle interior. Scale bar: 5 μm.

Scanning electron microscopy (SEM) was used to observe the assembled supraparticles (FIG. 3B), whose size ranged from a few micrometers to several tens of micrometers in diameter. Specifically, SMNPs were first synthesized using dopamine hydrochloride as the monomer under basic conditions, via one-pot self-oxidative polymerization, and then coated with silica shells using a modified Stöber method. See, e.g., Stöber, W.; Fink, A.; Bohn, E. Controlled growth of monodisperse silica spheres in the micron size range. *J. Colloid Interface Sci.* 1968, 26, 62-68, the disclosure of which is incorporated herein by reference in its entirety. The SMNP core diameter was 161±13 nm (FIGS. 7A-B) and SM@SiO$_2$ NPs were prepared a 183±9, 200±10, 218±10, and 262±10 nm, respectively. SiO$_2$ coating sizes were achieved by changing the reaction time from 33 to 150 min (FIGS. 4A-D, 7A-B). The SM@SiO$_2$ NPs were suspended in water after purification and assembled using a water-in-oil reverse emulsion process using vortex shear mixing to yield supraparticles suspended in 1-octanol. As can be seen, this process is facile to scale up. The SEM images (FIGS. 5A-D) of supraparticles reveals close packing of SM@SiO$_2$ NPs on the surface with solid internal structures built from disorderly packed SM@SiO$_2$ NPs (FIG. 8). By increasing the silica shell thickness, it is possible to tune structural color from blue to red (FIGS. 6A-D).

Figure 9:
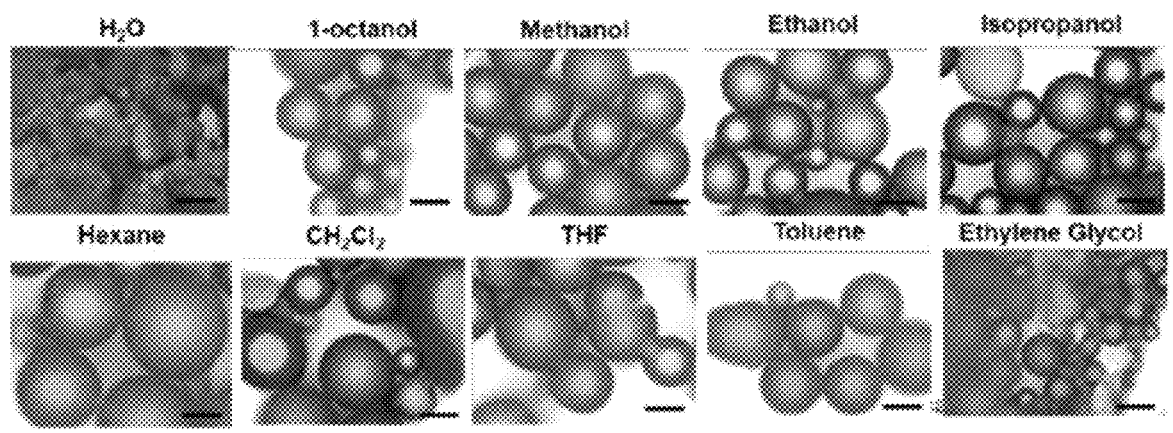
FIG. 9 are a series of optical images showing and comparing the stability of noncrosslinked green supraparticles in different commonly used solvents. Scale bar: 20 μm.
Figures 10A, 10B, 10C:
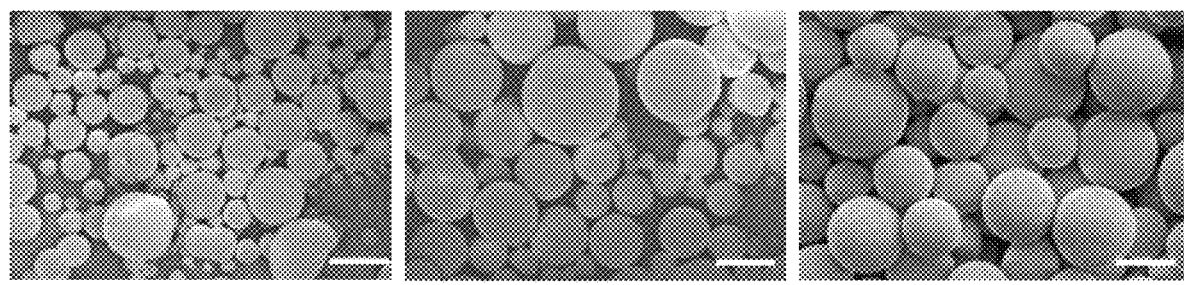
FIGS. 10A-F are SEM images of red SM@SiO$_2$ supraparticles crosslinked using PEGs of different molecular weights and topologies, and then dried on silicon wafers from water dispersions. Supraparticles were crosslinked with linear PEGs with different molecular weights: 2000 g/mol (FIG. 10A), 5000 g/mol (FIG. 10B), and 10 000 g/mol (FIG. 10C). Supraparticles were also crosslinked with 4-arm PEGs with different molecular weights: 2000 g/mol (FIG. 10D), 5000 g/mol (FIG. 10E), and 10 000 g/mol (FIG. 10F). Scale bars: 50 μm.
Figures 10D, 10E, 10F:
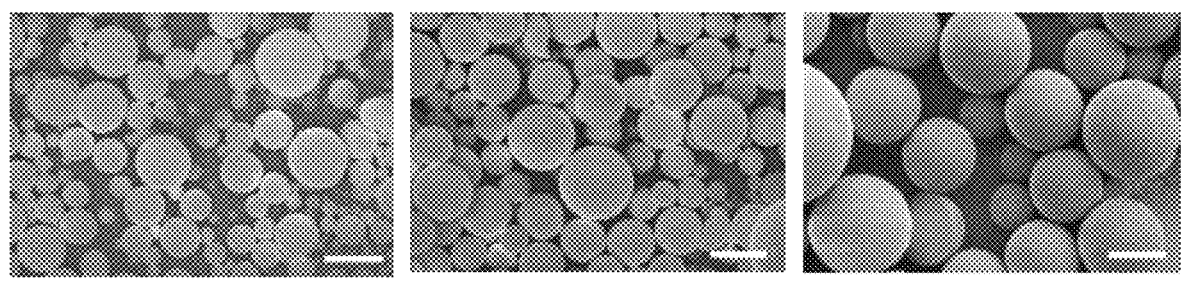
Figure 11A:
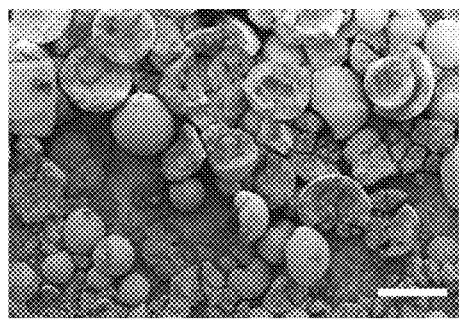
FIGS. 11A-H are SEM images (FIGS. 11A-D) and optical images (FIGS. 11E-H) of SM@SiO$_2$ supraparticles exposed to water and then dried in air on silicon substrates. Supraparticles formed from blue SM@SiO$_2$ NPs, diameter approx. 183 nm (FIGS. 11A and 11E); green SM@SiO$_2$ NPs, diameter approx. 200 nm (FIGS. 11B and 11F); yellow SM@SiO$_2$ NPs, diameter approx. 218 nm (FIGS. 11C and 11G); red SM@SiO$_2$ NPs, diameter approx. 262 nm (FIGS. 11D and 11H). Scale bars.
Figure 11B:
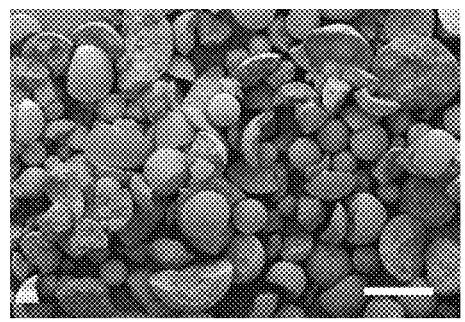
Figure 11C:
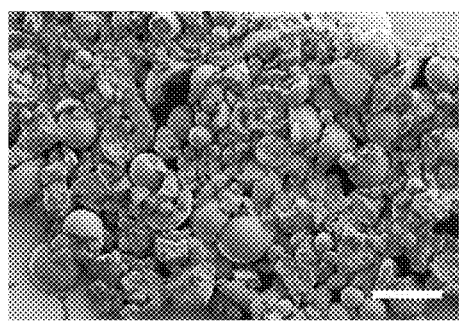
Figure 11D:
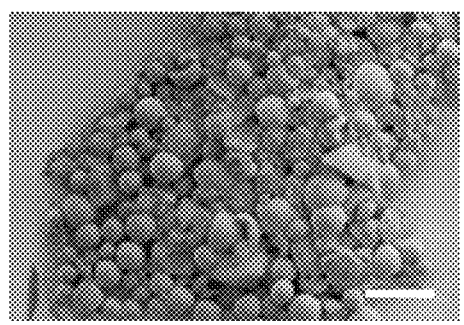
Figure 11E:
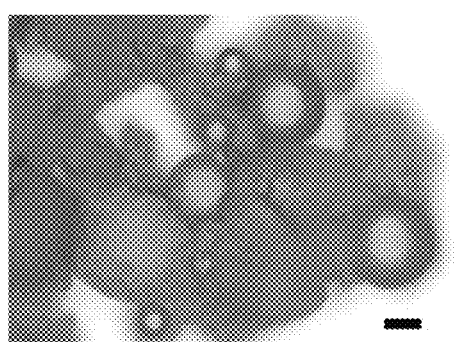
Figure 11F:
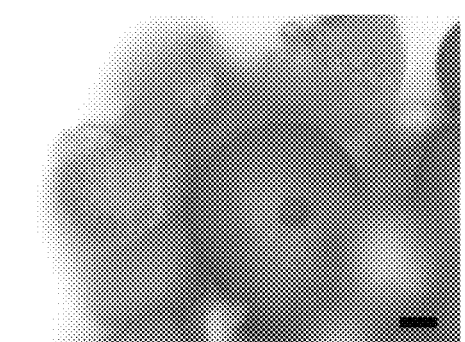
Figure 11G:
Figure 11H:
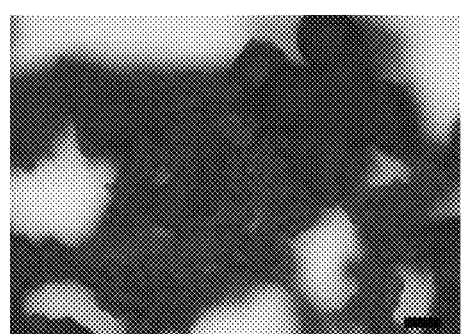
Figure 12A:
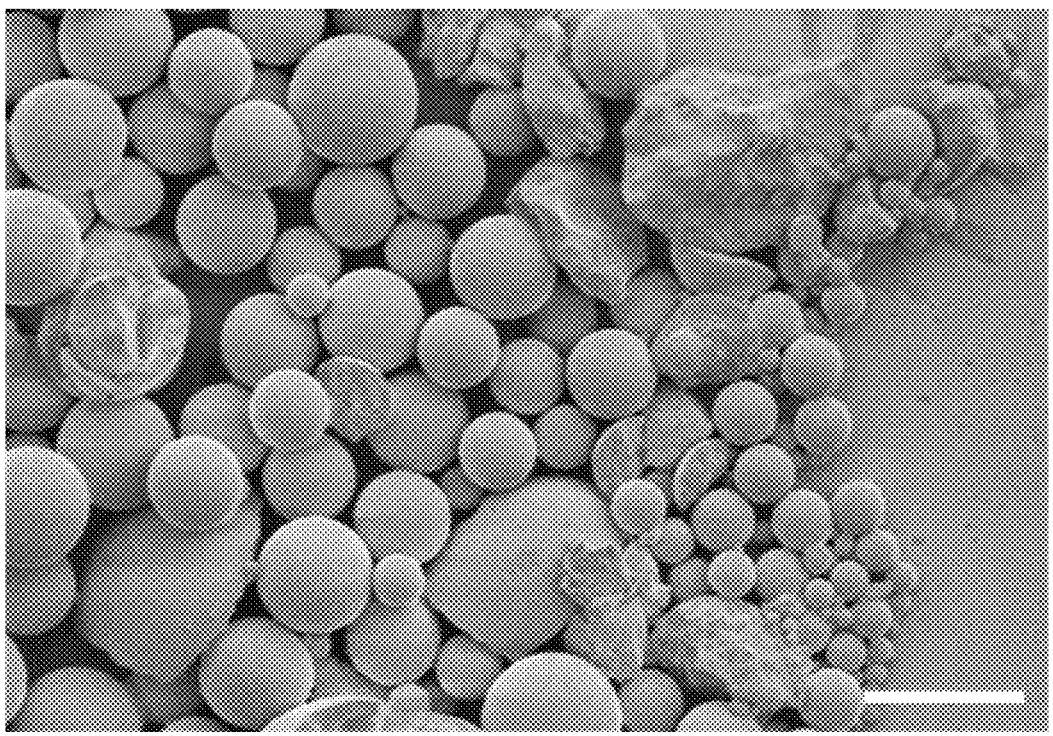
FIGS. 12A-B are SEM images showing the results of control experiments at low magnification (FIG. 12A) and high magnification (FIG. 12B) in which red supraparticles were suspended in methanol, without the addition of PEG. Scale bar: 50 μm (FIG. 12A), 10 μm (FIG. 12B). This control experiment was performed exactly as for the crosslinking experiment but excluding the PEG to check for the effect of methanol alone. The supraparticle surfaces were observed to roughen because some NPs dissociated. This confirms that the PEG crosslinker is needed to keep the SM@SiO$_2$ NPs intact in water.
Figure 12B:
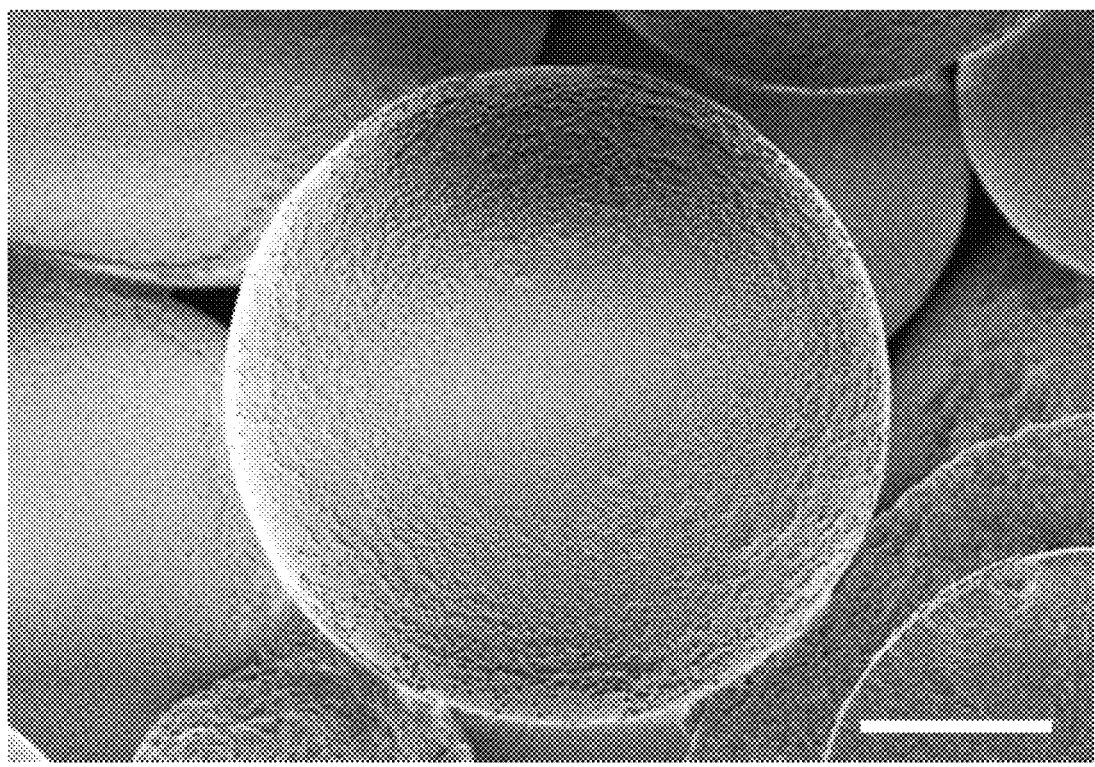

To evaluate the solvent stability of the supraparticles, they were removed from the 1-octanol and dispersed in water and commonly used organic solvents. It was found that they were susceptible to fragmentation in water, resulting in structural damage and concomitant loss of structural color (See, FIGS. 8, 9). The supraparticles were stable in some organic solvents such as alcohols. However, it important, however, for the SM@SiO$_2$ NPs to be stable in aqueous conditions and in the dry state, where they must also be durable to allow for their use as inks.

Accordingly, the hydrogen-bond crosslinking approach used in the present invention (See, FIG. 1) was evaluated. To do this, a series of PEGs were selected with different molecular weights (2000, 5000, and 10 000 g/mol) as well as topologies. For this, linear and 4-arm analogues as crosslinkers (linear PEG2k, PEG5k, and PEG10k; 4-arm PEG2k, 4-arm PEG5k, and 4-arm PEG10k) were employed. SM@SiO$_2$ NPs were made as described above Directly after assembly, the 1-octanol was removed, and the methanol/PEG solutions were added. The mixture was then incubated for 7 several hours to allow PEG coating to fully harden the supraparticles. These suspensions were allowed to settle, the supernatant removed, and the particles resuspended in methanol to remove excess PEG. Finally, methanol was removed and the PEG-crosslinked supraparticles were transferred to water. SEM revealed that supraparticles crosslinked by both linear and 4-arm PEGs stayed intact in water relative to the noncrosslinked supraparticles (FIGS. 10A-F] compared to FIGS. 11A-H, 12A-B).

Figure 13A:
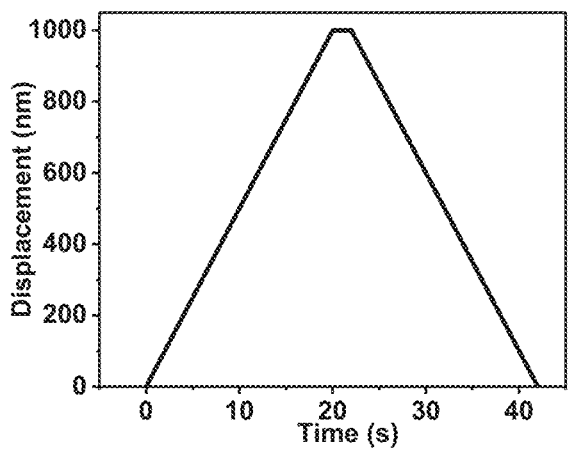
FIGS. 13A-F are a series of graphs showing mechanical properties of red supraparticles in the dry state tested in the displacement controlled mode by a nanoindenter. Specifically.
Figure 13B:
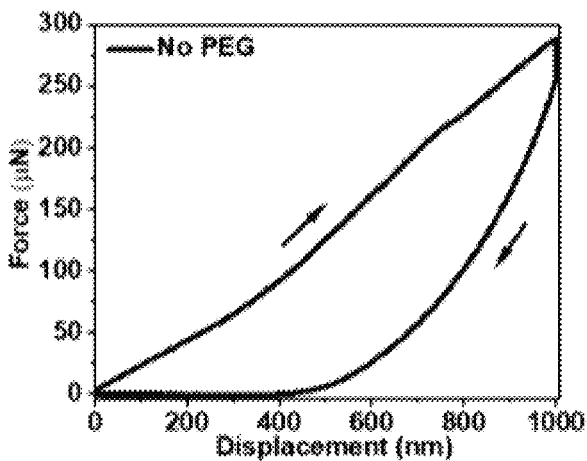
Figure 13C:
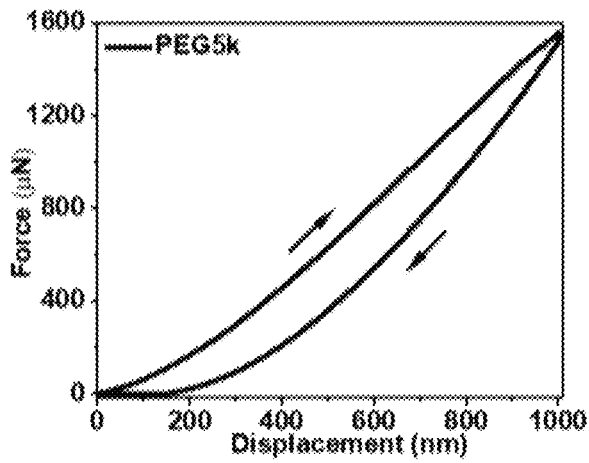
Figure 13D:
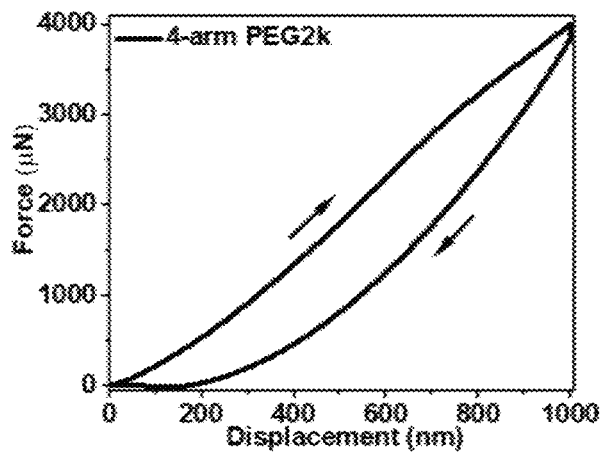
Figure 13E:
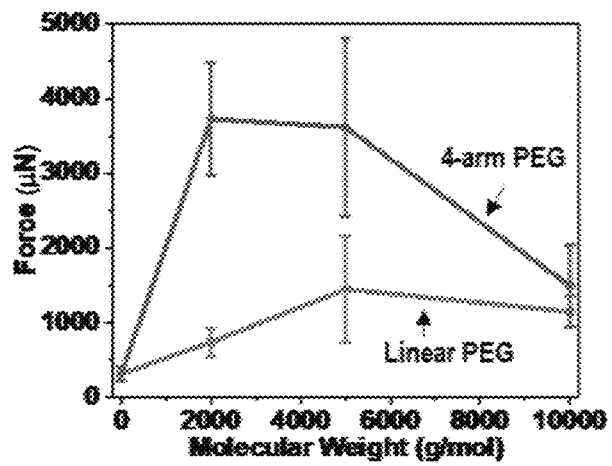
Figure 13F:
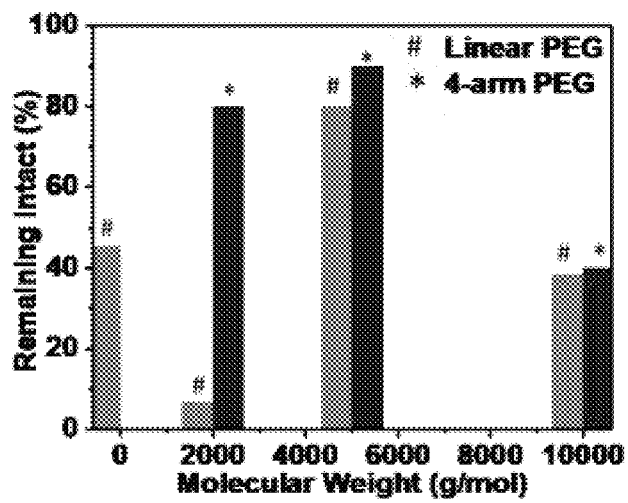
Figure 14A:
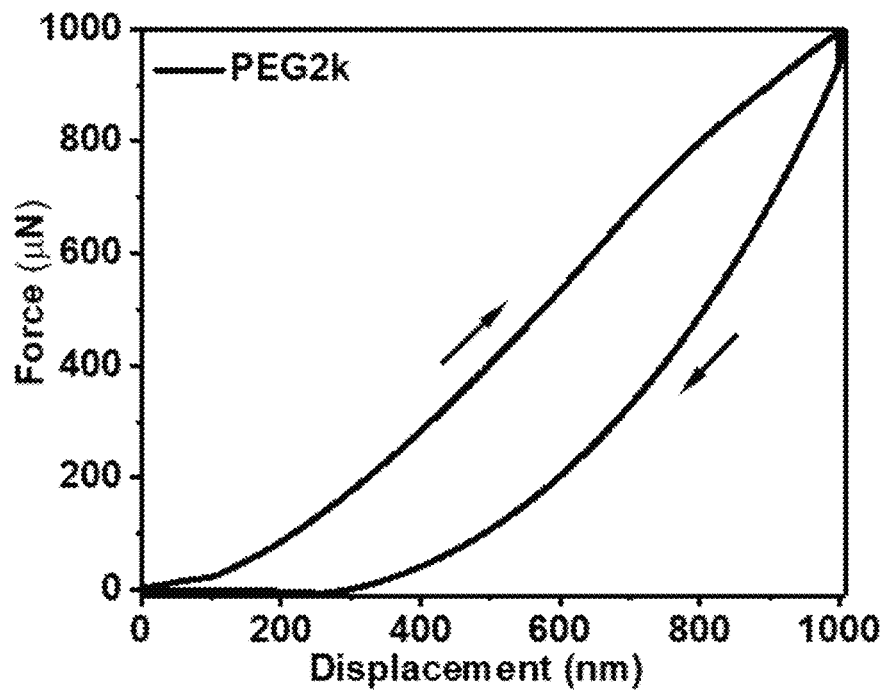
FIGS. 14A-D are typical Force-Displacement curves recorded during nanoindentation (the up right arrow-force loading, the down left arrow-force unloading). The indenter probe approached and retracted from red supraparticles crosslinked by different types of PEGs, PEG2k (FIG. 14A), PEG10k (FIG. 14B), 4-arm PEG5k (FIG. 14C), d) 4-arm PEG10k (FIG. 14D), at the speed of 50 nm/s and was held for 2 s at 1000 nm.
Figure 14B:
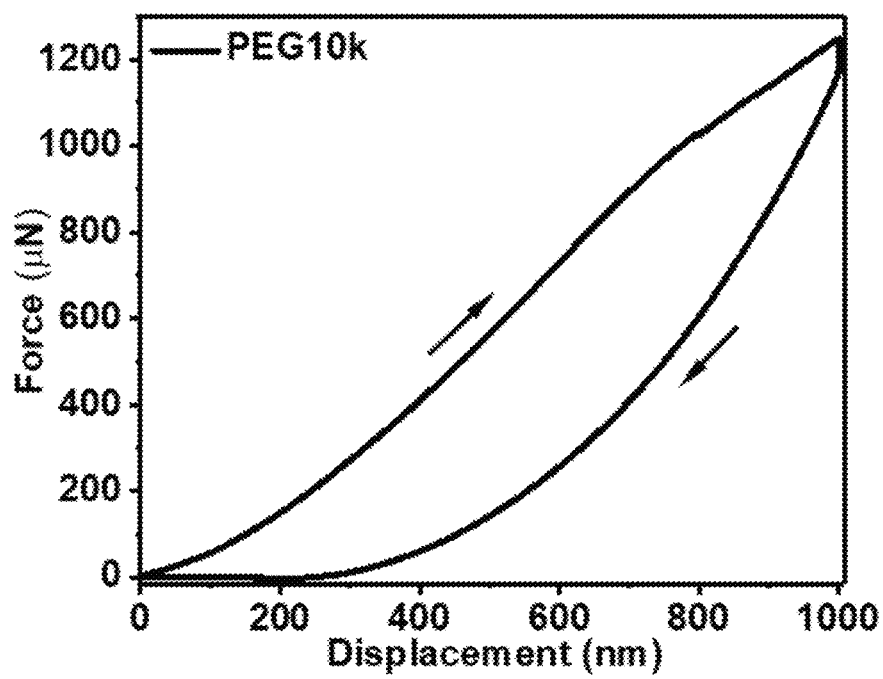
Figure 14C:
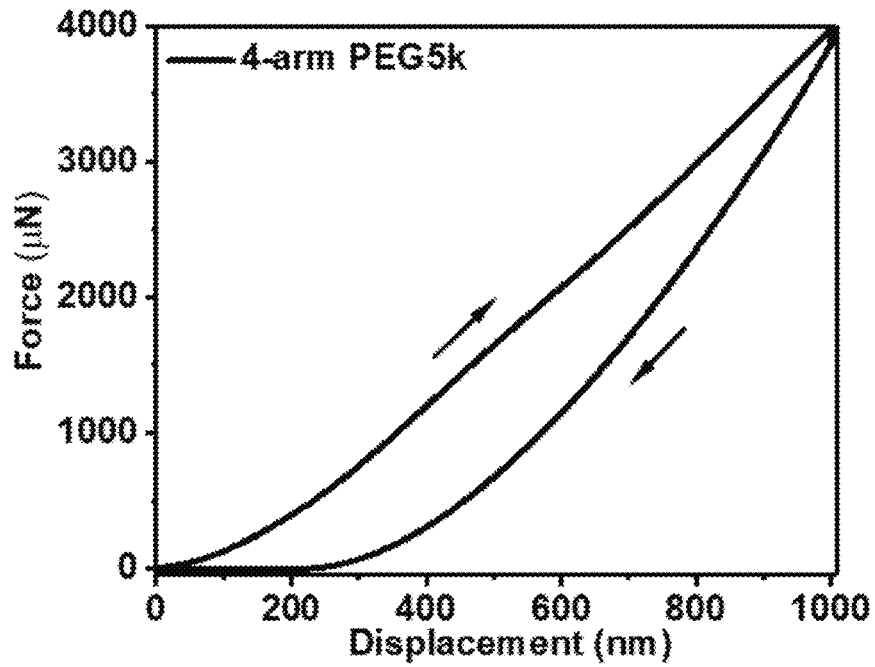
Figure 14D:
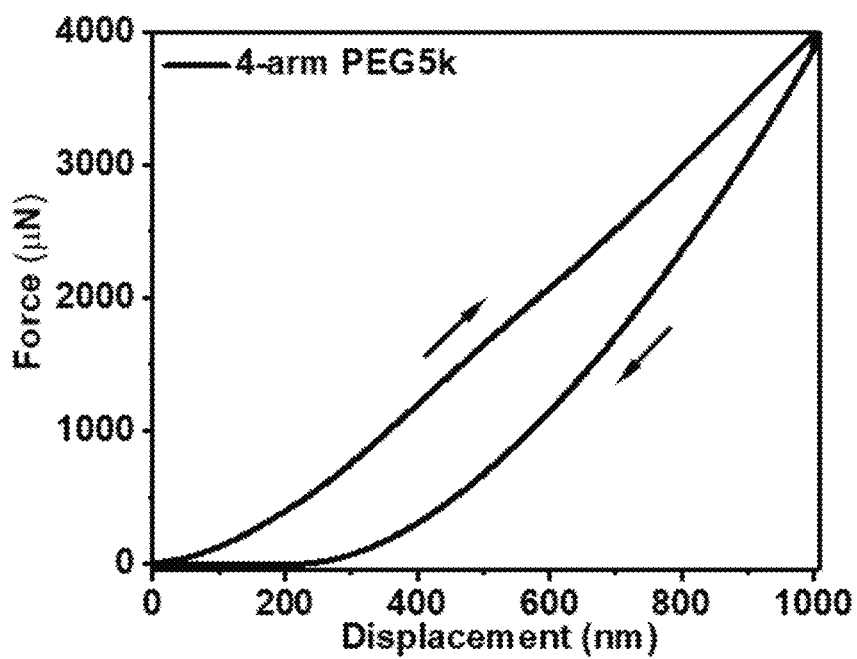
Figure 15A:
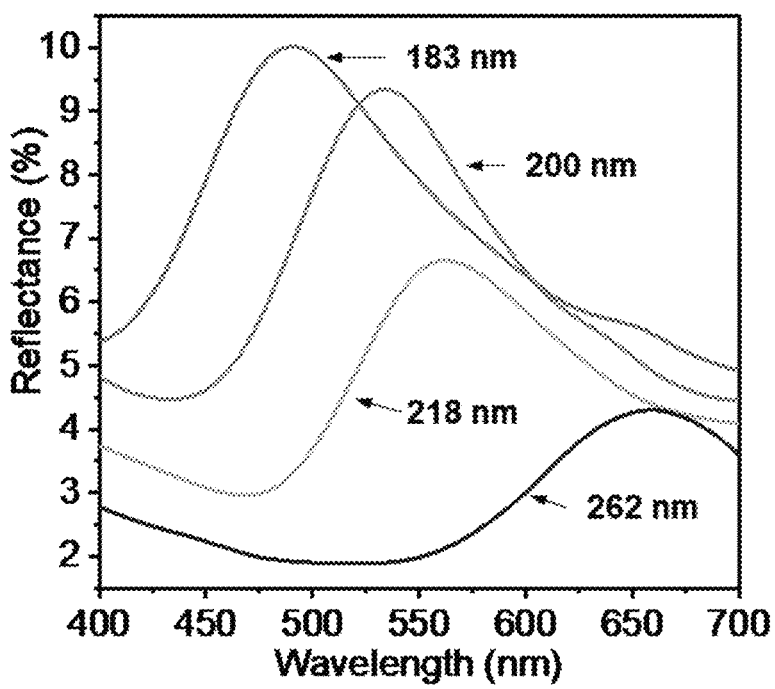
FIGS. 15A-E are a graph showing the reflectance spectra (FIG. 15A) and corresponding optical images in full color (FIGS. 15B-E) for 4-arm PEG2k crosslinked photonic supraparticles made of different sized SM@SiO$_2$ NPs (blue, green, yellow, and red lines represent blue, green, yellow, and red supraparticles assembled from SM@SiO$_2$ NPs with diameter of 183 nm (FIG. 15B), 200 nm (FIG. 15C), 218 nm (FIG. 15D), and 262 nm (FIG. 15E), respectively).
Figure 15B:
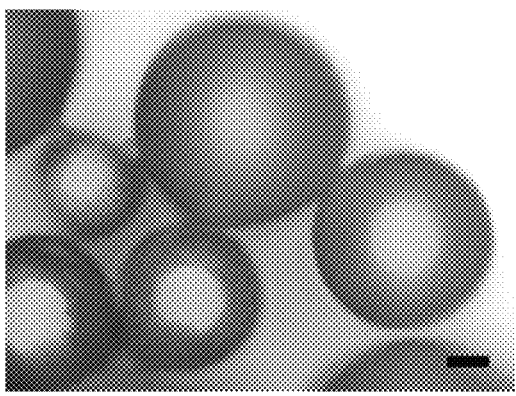
Figure 15C:
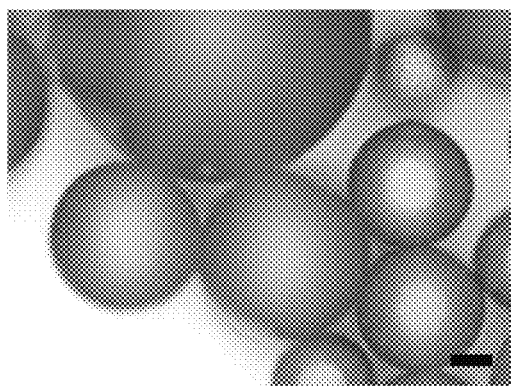
Figure 15D:
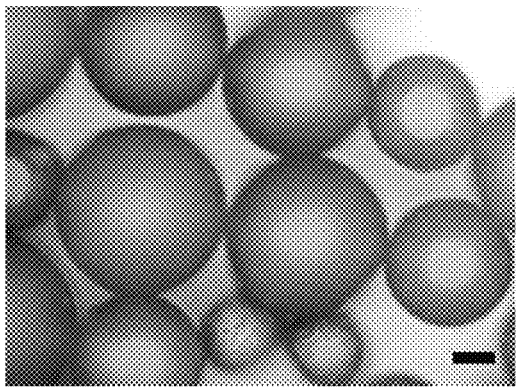
Figure 15E:
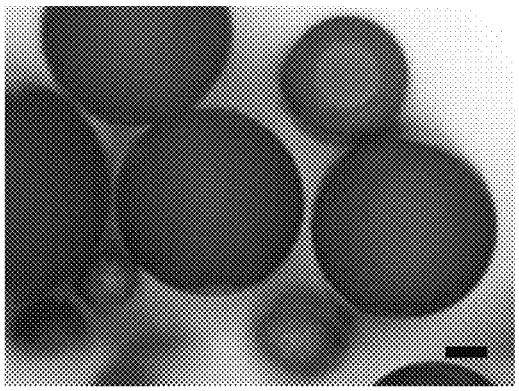
Figure 16A:
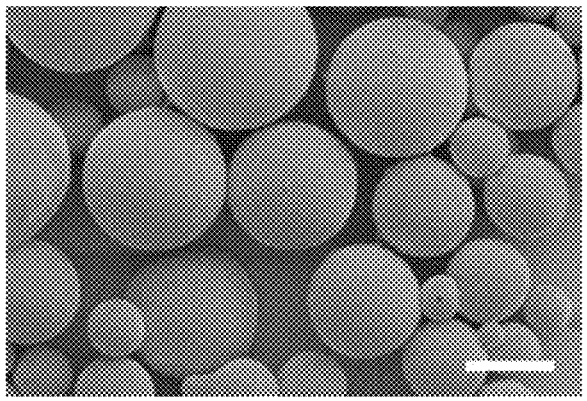
FIGS. 16A-D are a series of SEM images of crosslinked blue (FIG. 16A), green (FIG. 16B), yellow (FIG. 16C), and red (FIG. 16D) SM@SiO$_2$ supraparticles showing the morphology of 4-arm PEG2k crosslinked supraparticles exposed in water and then dried in air on silicon wafers. Scale bars: 50 μm.
Figure 16B:
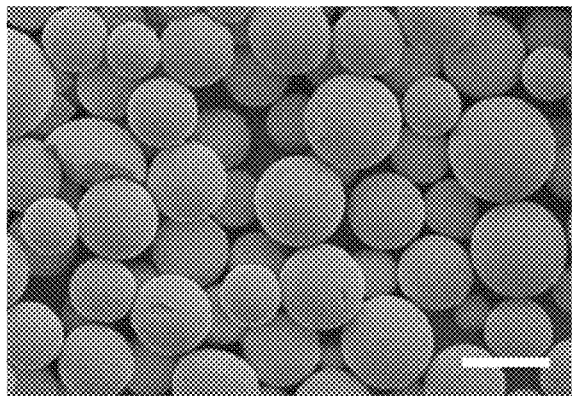
Figure 16C:
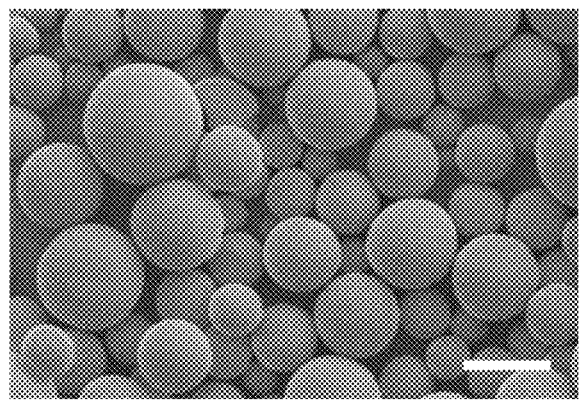
Figure 16D:
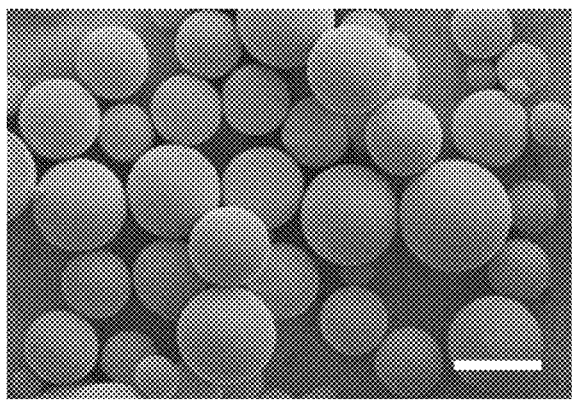

To quantify the mechanical properties of crosslinked supraparticles in comparison to noncrosslinked versions, the compressive stress of crosslinked and noncrosslinked (control) supraparticles were measured using a nanoindenter with a flat-ended 200 µm (diameter) probe (FIGS. 13A-F). (See, Klajn, R.; Bishop, K. J. M.; Fialkowski, M.; Paszewski, M.; Campbell, C. J.; Gray, T, P.; Grzybowski, B. A. Plastic and moldable metals by self-assembly of sticky nanoparticle aggregates. *Science* 2007, 316, 261-264, the disclosure of which is incorporated herein by reference in its entirety). The loading and unloading speeds were tuned to 50 nm/s and the probe was held for 2 s at maximum displacement (FIG. 13A).

Analysis of the Force-Displacement curves for 10-15 supraparticles with an average diameter of 35±7 µm (FIGS. 13B-F, 14A-D), revealed that (1) the compressive force of supraparticles crosslinked with PEGs was significantly higher than noncrosslinked supraparticles; (2) the supraparticles crosslinked with 4-arm PEGs exhibited higher compressive forces compared to those crosslinked by linear PEGs; (3) the compressive force of supraparticles crosslinked by 4-arm PEG with molecular weights of 2000 and 5000 (4-arm PEG2k, 4-arm PEG5k) was at least 10-fold higher compared to the noncrosslinked supraparticles; and (4) as high as 80% of the crosslinked supraparticles remained intact after indentation measurements while that percentage decreased to 45% with respect to noncrosslinked versions. However, the 4-arm PEG2k showed better recovery ability than 4-arm PEG5k as indicated from the x-intercepts in the force-displacement curves (FIGS. 13D, 14A-D).

Without wishing to be limited by theory in any way, it is believed that the improved resistance to compressive force may be attributed to the hydrogen-bonding interactions between PEGs as crosslinkers and the silanol groups on silica surfaces. The molecular weight and topology of PEG were observed to affect the compressive force of supraparticles, which might be because of the difference in crosslinking stemming from entanglements or inter-PEG chain binding that influences the infiltration of PEGs into the supraparticles through the interstitial spaces between SM@SiO$_2$ NPs. It should also be noted that variation in these measurements across the sample likely arose due to size differences of supraparticles (35±7 µm) measured (FIG. 13E), With the mechanical strength of supraparticles crosslinked by 4-arm PEG2k outperforming other PEG derivatives and were selected for the crosslinker in subsequent experiments.

Figure 17:
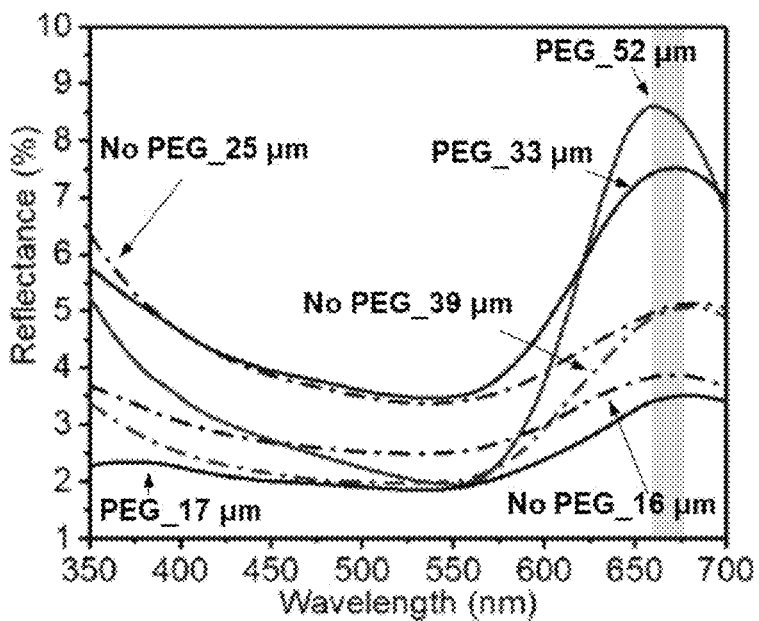
FIG. 17 are reflectance spectra of noncrosslinked and 4-arm PEG2k crosslinked red supraparticles of different sizes. Dashed lines: average spectra from three noncrosslinked red supraparticles with average diameters of 40 μm, 25 μm and 15 μm as shown. Solid lines: average spectra of three 4-arm PEG2k crosslinked red supraparticles with average diameters of 50 μm, 30 μm and 15 μm respectively. All the reflectance peaks were concentrated around 670 nm with a slight peak shift within the red wavelengths, indicating that 4 arm-PEG2k and the supraparticle size had an imperceptible influence on the hue.
Figure 18A:
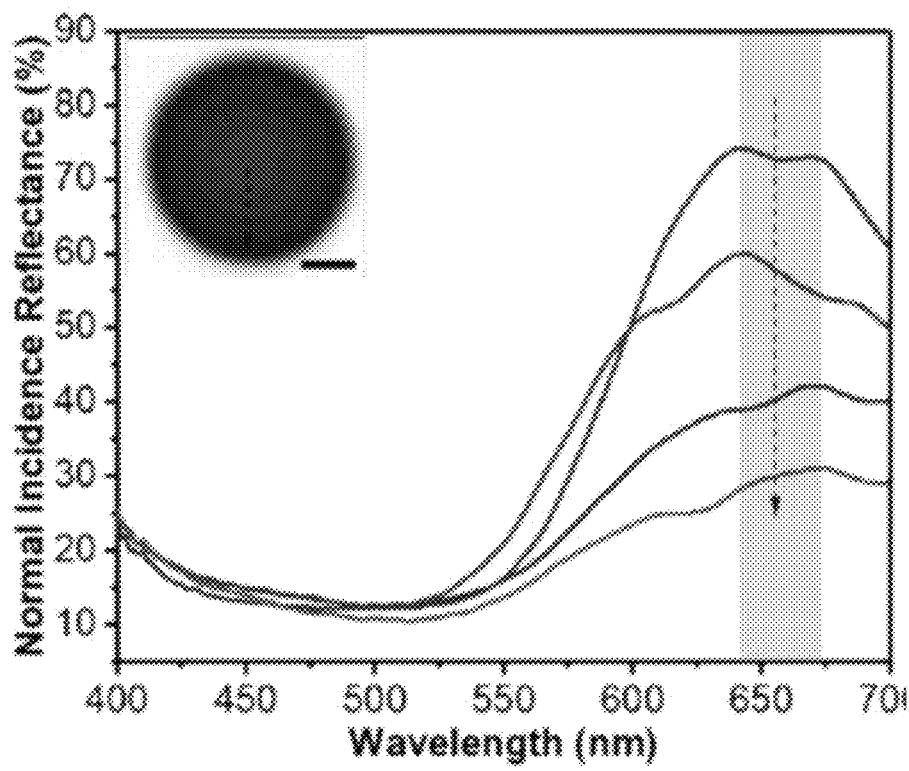
FIGS. 18A-B are graphs showing hyperspectral imaging and spatially discriminated spectra of individual red supraparticles got a 4-arm PEG2k crosslinked supraparticle (FIG. 18A) and a noncrosslinked supraparticle (FIG. 18B). The color remained homogeneously red in all pixels. Note that the relative intensity of the color decreased gradually from the top of the supraparticle to the side edge (shown by the arrows), without significant change in the red hue. Scale car: 10 μm.
Figure 18B:
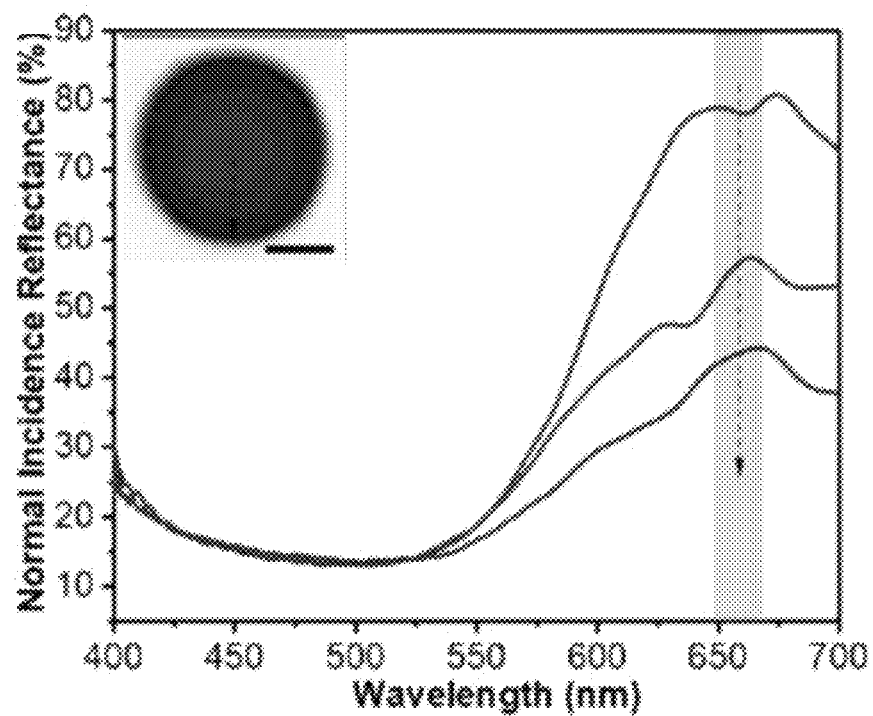

Crosslinking with 4-arm PEG2k was then tested for each color of SM@SiO$_2$ supraparticles (FIGS. 15A-E, 16A-D). Here, the structural color of the crosslinked SM@SiO$_2$ supraparticles was determined by measuring the averaged reflectance spectrum from three individual supraparticles using a microspectrophotometer (FIG. 15). Optical imaging of collections of supraparticles in turn visibly reveals the range of colors still accessible following crosslinking (FIG. 15B-E). In addition, 4 arm-PEG2k and the supraparticle size had an imperceptible influence on the hue (see noncrosslinked supraparticles in FIGS. 6A-D and 4-arm PEG2k crosslinked versions in FIGS. 15B-E), which were confirmed using reflectance spectrum of red supraparticles (FIG. 17) and hyperspectral imaging (FIG. 18A-B).

Figure 2A:
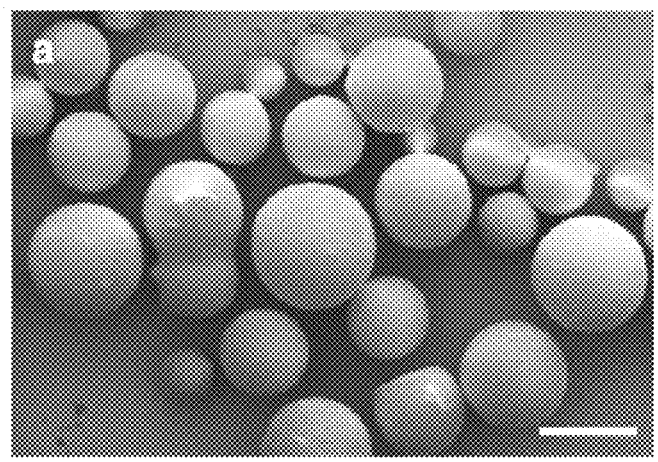
FIGS. 2A-B SEM images of SMNP supraparticles after assembly (FIG. 2A) and 4-arm PEG2k crosslinked SMNP supraparticles exposed in water and dried on silicon wafer (FIG. 2B). Scale bar: 50 μm.
Figure 2B:
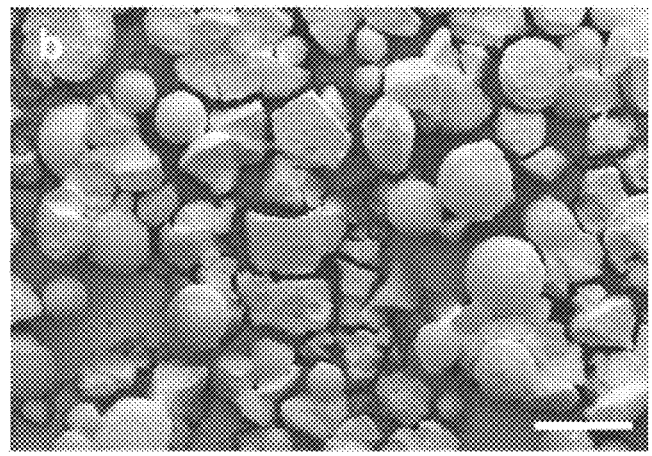
Figure 19:
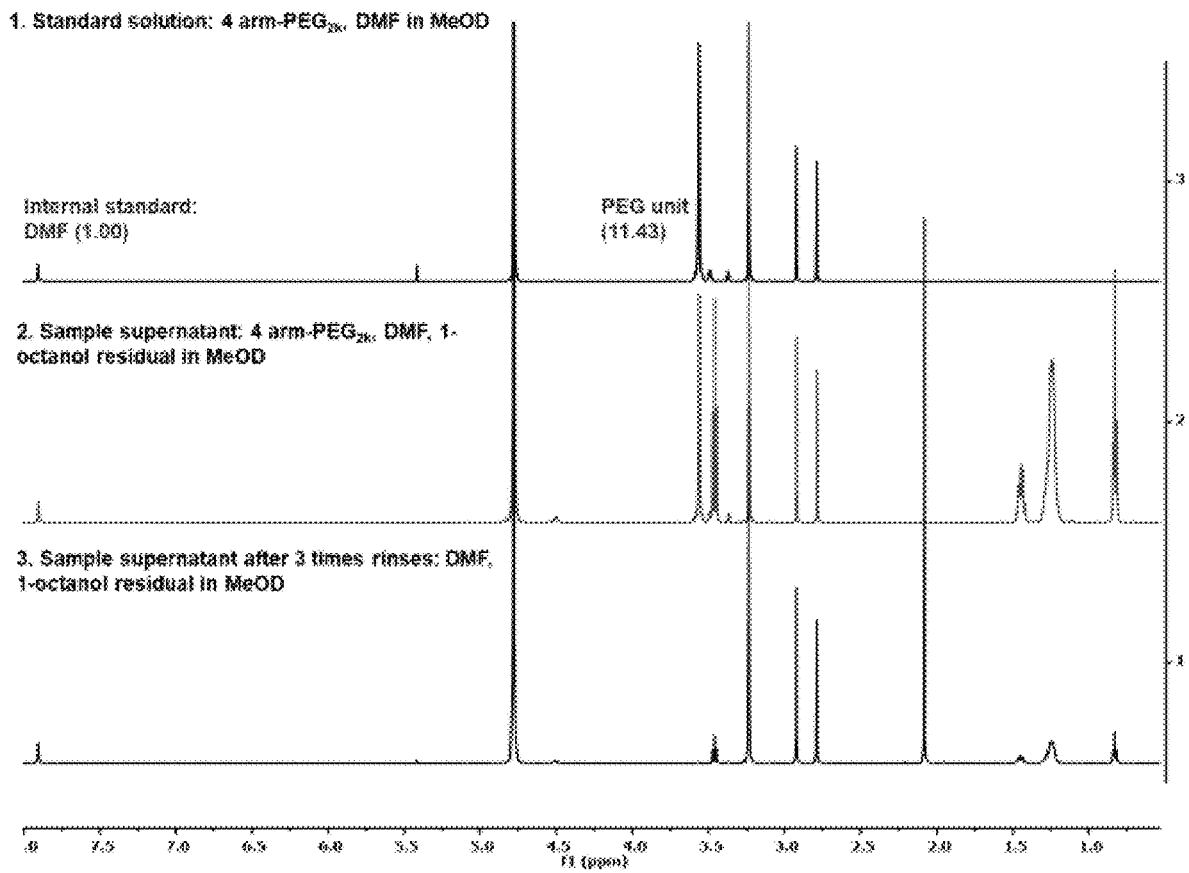
FIG. 19 is a comparative $^1$H-NMR spectrum of the supraparticle supernatants and 4-arm PEG2k mixture.

To test if the silica surface was necessary for PEG hydrogen bonding stabilized crosslinking, control experiments using SMNP supraparticles (formed from SMNPs without silica shells) were conducted using the 4-arm PEG2k as a crosslinker. In this case, no stabilization of SMNP supraparticles was observed (FIG. 2A-B). Furthermore, using proton nuclear magnetic resonance ($^1$H-NMR) to characterize the supernatant of supraparticles and 4-arm PEG2k mixture, the amount of 4-arm PEG2k bound in supraparticles was calculated to be 10 wt. % with respect to the mass of supraparticles (FIG. 19). Additionally, a small red shift of C—O—C stretching was observed in the mixture of PEG5k and silica nanoparticles (80 wt. % PEG5k), compared to pure PEG5k in Fourier transform infrared spectroscopy (FT-IR, FIG. 20), which might be due to the hydrogen-bonds.

Figure 21A:
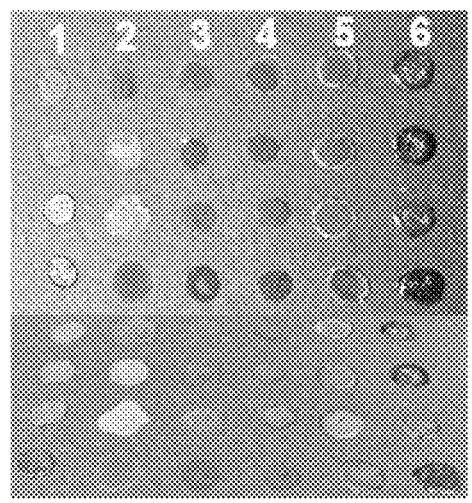
FIG. 21A is an optical image of a series of nanoparticles and supraparticles in aqueous inks deposited on paper showing different angles, wherein lines 1-6 are: 1, SM@SiO$_2$ NPs; 2, noncrosslinked supraparticles; 3, crosslinked supraparticles; 4, crosslinked supraparticles blended with gum Arabic; 5, crosslinked supraparticles blended with gloss medium; 6, crosslinked supraparticles blended with airbrush medium).
Figure 21B:
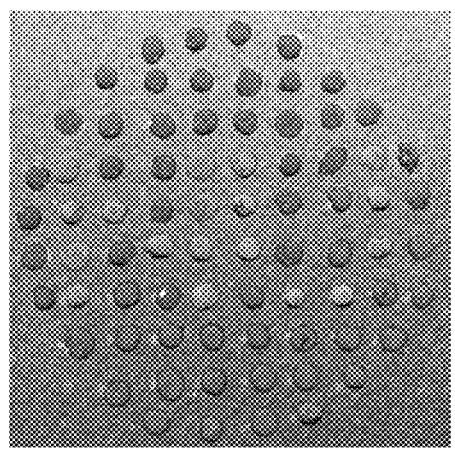
FIGS. 21B-C are photographs of a deuteranopia test pattern showing a green dot array spelling "NU", surrounded by a red dot array (4.5 cm by 4.5 cm) made from crosslinked green and red supraparticle aqueous inks blended with gum Arabic taken from different angles. Scale bar: 10 μm.
Figure 21C:
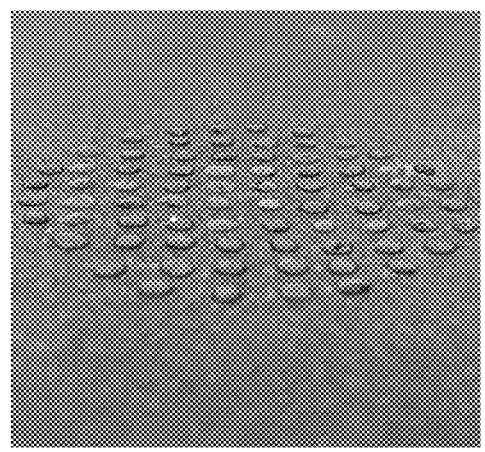
Figure 22:
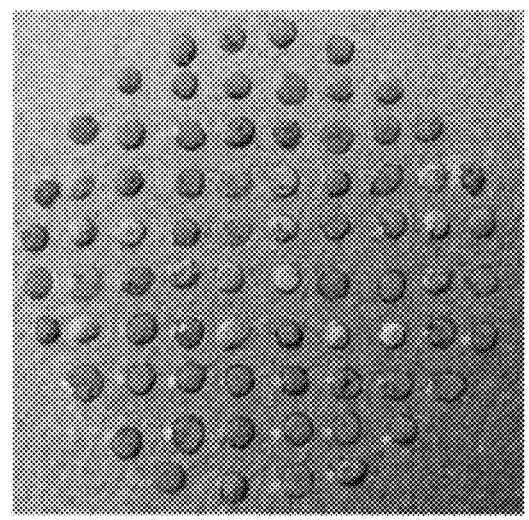
FIG. 22 is a photo of the deuteranopia test pattern in FIGS. 21B-C taken after 10 months at room temperature in air.

With enhanced stability of supraparticles in aqueous solvents revealed directly by optical imaging and spectroscopy, and enhanced stability in the dry state shown by SEM and mechanical force testing, the photonic supraparticles were next directly blended into inks and painting media for deposition on paper (FIGS. 21A-C). Each of the crosslinked photonic supraparticles were mixed with three commonly used media separately: (1) gum Arabic, a typical binding component for calligraphy inks or watercolor paintings; (2) an acrylic painting medium (gloss medium); and (3) a medium for airbrush painting (FIG. 21A). The as-formulated inks were subsequently dropcast on paper. The crosslinked supraparticles showed vivid colors while the noncrosslinked supraparticles and inks composed of SM@SiO$_2$ NPs but not preformed into supraparticles resulted in dull or dark colors. Indeed, SM@SiO$_2$ NPs dried as powders are brown in color. In addition, the supraparticle colors remained after blending with different painting media which also enabled the supraparticle inks to bind stronger with the paper after drying. Gum Arabic showed superior performance as an aqueous ink binder. Therefore, gum Arabic was blended with green and red supraparticles crosslinked with 4 arm-PEG2k, which were then applied to produce a deuteranopia test pattern (FIG. 21B-C) as a proof of concept. Notably, the pattern and its colors were stable without fading or distortion after 10 months at room temperature in air (FIG. 22).

In summary, a facile, hydrogen-bond crosslinking method for fixing the building blocks of supraparticles is described. This was achieved by mixing a branched PEG with SM@SiO$_2$ supraparticles, which led to enhanced stability in aqueous solvents and in the dry state. Notably, the compressive force of supraparticles crosslinked by 4-arm PEG2k is increased at least 10-fold relative to a noncrosslinked analogue. With the enhanced stability of photonic supraparticles both in solvents and dry state, it is possible to directly blend the supraparticles and deploy them as inks or paints with standard media for deposition on paper. It is believed that this type of colorful structural ink has the potential to replace molecular and metal-based pigments commonly used in applications where human contact is likely, for example in cosmetic formulations. Furthermore, the deposition of these supraparticles as inks is currently under investigation in a variety of settings including in inkjet printing.

EXAMPLES

The following examples are offered to more fully illustrate the invention but are not to be construed as limiting the scope thereof. Further, while some of examples may include conclusions about the way the invention may function, the inventors do not intend to be bound by those conclusions but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Synthesis of Silicate Coated Synthetic Melanin Nanoparticles (SM@SiO$_2$ NPs)

SM@SiO$_2$ NPs were synthesized in two steps. SMNPs were first synthesized by oxidative polymerization of dopamine hydrochloride (C$_8$H$_{11}$NO$_2$·HCl, Alfa Aesar) under basic conditions (pH=10), and then coated SMNPs with a silica shell (SiO$_2$) via a modified Stöber method. (See, Stöber, W.; Fink, A.; Bohn, E. J. Controlled growth of monodisperse silica spheres in the micron size range. *J. Colloid Interface Sci.* 1968, 26, 62-68, the disclosure of which is incorporated herein by reference. To achieve this, typically, 1.1 mL of ammonium hydroxide (NH$_4$OH, 28.0-30.0% NH3 basis, Sigma-Aldrich) was mixed with a solution of 110 mL ethanol (200 proof, Recon Labs, Inc.) and 20 mL Milli-Q water (resistivity of 18.20 MΩ·cm at 20° C., Thermo Scientific) in 5 min, and then 460 mg of dopamine hydrochloride was added with vigorous stirring. The size of SMNPs can be tuned by changing the amount of either dopamine hydrochloride or NH$_4$OH. The SMNPs were purified using a centrifuge (Fisher Scientific) under 10,000 rpm for 10 min and then dispersed in Milli-Q water. After repeating the purification procedure four times, the as-prepared SMNPs were dispersed in Milli-Q water at 3.7 mg/mL for the subsequent coating step. 8.75 mL of SMNPs solution was first mixed with 50 mL isopropanol (Sigma-Aldrich) followed by 1.2 mL NH$_4$OH, and then 0.8 mL of tetraethyl orthosilicate (TEOS, Acres Organics), as the silica precursor, was added dropwise into the mixture. Core shell particles with different shell thicknesses/diameters can be achieved by simply changing the reaction time. The core-shell particles were purified with water by centrifugation (5,000-10,000 rpm for 6 min). This was repeated three times before suspending the particles in water at 30 mg/mL.

Example 2

Supraparticle Assembly

A reverse emulsion method was used to form supraparticles via a modified published protocol. See, Xiao, M.; Hu, Z. Y.; Wang, Z.; Li, Y. W.; Tormo, A. D.; Le Thomas, N.; Wang, B.; Gianneschi, N. C.; Shawkey, M. D.; Dhinojwala, A. Bioinspired bright noniridescent photonic melanin supraballs. *Science Advances* 2017, 3, e1701151, the disclosure of which is incorporated herein by reference in its entirety. Briefly, 30 µL of the above aqueous core-shell particles solution was added to 1 mL anhydrous 1-octanol (Sigma-Aldrich) in a 2.0 mL microtubes (Corning Inc.). The black aqueous solution and the clear 1-octanol form layered liquids at the beginning. A digital vortex (Fisher Scientific) was used to mix the solution to make water-in-oil emulsions. The shaking 3 speed was set at 1800 rpm/2.5 min (1,800 rpm holding for 2.5 min) and then reduced to 1,200 rpm/3 min. The whole solution became uniform and clear after vortexing. Larger particles disperse in the solution and then settle to the bottom within 10 min. It should be noted that the shaking speed and time depends on the size and shape of the containers which should be hydrophobic at the interior surface. For large scale supraparticle assembly (1 mL particle solution in 30 mL 1-octanol), a 50 mL centrifuge tube (Fisher Scientific) was used, and the shaking speed was 2,000 rpm/2.5 min and then reduced to 1,800 rpm/3 min.

Example 3

Supraparticle Crosslinking Procedure

Linear and 4-arm poly(ethylene glycol) (PEG) with different molecular weights (Mw~2,000 g/mol; 5,000 g/mol; 10,000 g/mol) were used to crosslink supraparticles. These are: PEG2k (Sigma-Aldrich), PEG5k (Sigma-Aldrich), PEG10k (Sigma Aldrich), 4-arm PEG2k (Nanosoft Polymers), 4-arm PEG5k (Nanosoft Polymers), and 4-arm PEG10k (Sigma-Aldrich). Stock solutions of the various types of PEGs were prepared by dissolving them in methanol (Fisher Scientific). After supraparticle assembly, the supernatant was removed, and the PEG solutions were added to the supraparticles (mass ratio of PEG to supraparticles=4:9). Free PEG was rinsed away with four washes of methanol after the supraparticle-PEG solutions were incubated overnight. Washes involved gentle shaking of the crosslinked supraparticles suspended in methanol, followed settling of the particles, removal of the supernatant and repeat.

Example 4

Transmission Electron Microscopy (TEM)

Suspensions of SMNPs and core-shell nanoparticles were loaded onto 400 mesh carbon grids (Ted Pella, INC.) and characterized using a Hitachi HT-7700 microscope. The images were captured at a voltage of 120 kV with an Orius SC 1000A camera. ROI (Region of Interest) manager in ImageJ was used to analyze the nanoparticle sizes. For each type of the nanoparticles, the diameters of 50 nanoparticles were measured and the average values as well as standard deviations were calculated. (See, FIGS. 4A-D, 7A-B])

Example 5

Scanning Electron Microscopy (SEM)

Supraparticle suspensions were deposited on silica wafers (Ted Pella, INC.) and dried under 40° C. in air. The prepared samples were sputtered with a layer of osmium to a thickness of 15 nm using an osmium coater (SPI Supplies). The morphology of the supraparticles was observed using a scanning electron microscope (SEM, Hitachi SU8030). (See, e.g., FIGS. 2A-B, 3B, 5A-D, 8, 10A-F, 11A-D, 12A-B, and 16A-D)

Example 6

Optical Imaging and Overall Spectral Characterization

Optical images were acquired using an optical microscope (Nikon L-UEPI) equipped with ZEN software (Carl Zeiss Microscopy GmbH). Reflectance spectra of individual supraparticles were measured using a CRAIG AX10 UV-vis microspectrophotometer (CRAIG Technologies Inc.). A 75-W xenon short-arc lamp (Ushio UXL75XE) was used as a light source and a silver mirror standard was used as a reflectance standard. For each type of sample, three supraparticles and averaged the spectra were measured. (See FIGS. 5B-E, 6A-D, 9 and 11E-H)

Example 7

Nanoindentation Measurements

Red supraparticle suspensions were deposited on silica wafers (Ted Pella, INC.) and dried under 40° C. in air. Here, fewer supraparticles were deposited on the silicon wafers because loading measurements were conducted supraparticle by supraparticle such that they needed to be separated in space. A nanoindenter (Hysitron TI 950 TriboIndenter, Bruker) equipped with a cylindrical shaped probe with a flat end (probe diameter 200 µm) was used to quantify mechanical properties of noncrosslinked versus crosslinked supraparticles by measuring compressive force when compressing them down to 1,000 nm. The loading/unloading speed was set to 50 nm/s and held the probe for 2 s at maximum displacement. Measurements were made and repeated on the same supraparticle four times by changing the displacement (250 nm, 500 nm, 750 nm and 1,000 nm) each time. Displacement data of 1,000 nm are shown, providing direct information on the loading (compressive force) trends for each type of supraparticle and to make directly relevant comparisons. Further increases in displacement can break the supraparticles which resulted in difficulty obtaining the maximum compressive forces. Since the size of supraparticles would affect the loading results, measurements on supraparticles with an average diameter of 35±7 µm were performed. For each type of sample, 10 to 15 supraparticles were measured, giving average compressive force values. (See. FIGS. 4A-F)

Example 8

Hyperspectral Imaging and Spectral Mapping

Using a PARISS® hyperspectral imaging system (LightForm Inc.; http://lightforminc.com/index.html) that was mounted on a Nikon Eclipse 80i microscope, individual supraparticles were analyzed with a 50× objective, and their specular reflectance spectra collected for each pixel in the field of view when the top of the supraparticle was in focus. A silver mirror standard was used as a reflectance standard. A minimum correlation coefficient of 99.0% for the spectral analyses was adopted, indicating that pixels showed the same reference spectrum when sharing more than 99.0% similarity. Each reference spectrum (which shows the actual spectral color in wavelength) was then assigned a coded color that was mapped back to the area where it was acquired. Thus, the mapped images have a color-code that reflects the identity of corresponding spectra (and not the actual color of the sample). Wavelength 6 calibration was performed with an MIDL Hg+/Ar+ emission lamp (LightForm, Asheville, NC, USA), and accuracy was recorded and verified to be better than 2 nm. (See. FIG. 18A-B)

Example 9

$^1$H Nuclear Magnetic Resonance ($^1$H NMR) on the Amount of 4-Arm PEG2k Bound in Supraparticles The supraparticles were assembled in a 2 mL microtube following the above procedures (0.9 mg supraparticles were formed for each tube). The supraparticles were rinsed with deuterated methanol (CD$_3$OD, Sigma-Aldrich) twice after removing the supernatant. Two stock solutions of 4-arm PEG2k and Dimethylformamide (DMF, used as an internal standard, Fisher Scientific) in CD$_3$OD were made separately. 0.4 mg 4-arm PEG2k was added into each tube of supraparticles to mix overnight. Then, the supraparticles were rinsed with CD3OD three times with the supernatant being collected each time (supraparticles would settle to the bottom). The supernatant sample was centrifuged and then 50 µL DMF, as an internal standard, was added (the volume of DMF to the remaining supernatant was 1:16). These samples were then ready for obtaining $^1$H NMR spectra (FIG. 19 (2)]). To test if there was still free 4-arm PEG2k left in the supraparticle supernatant after three rinses, the supraparticles were washed one more time having the supernatant collected, and 50 µL DMF was added as an internal standard (FIG. 19 (3), same volume ratio). As a control experiment, 0.4 mg 4-arm PEG2k was dissolved in CD3OD and DMF as an internal standard as above (FIG. 19 (1)). $^1$H NMR spectra were recorded on a Bruker Avance III HD system equipped with a TXO Prodigh probe (500 MHz) in CD3OD. For each type of solution, the experiments were repeated three times. Integration was performed on each spectrum with the peak area of DMF set as 1.00. The average peak area of the standard solution was calculated to be 11.43 and that of sample supernatant was 8.84 (24.5% loss in mass). No free 4-arm PEG2k was left in the rinsed supraparticles. The decrease of 4-arm PEG2k in solutions was ascribed to an amount of 4-arm PEG2k, now incorporated into the supraparticles, of 10 wt. %. (See. FIG. 19)

Example 10

Fourier Transform Infrared Spectroscopy (FTIR)

Figure 20:
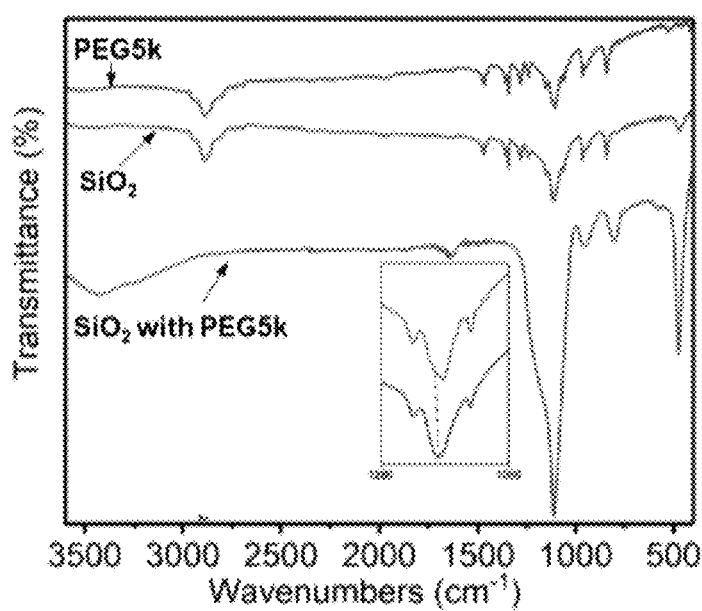
FIG. 20 is a comparative Fourier transform infrared spectroscopy (FT-IR) of PEG5k, SiO2, and SiO2 (20 wt. %) with PEG5k (80 wt. %) mixed with Potassium Bromide (KBr) powder.

FTIR (Nicolet iS50 FT-IR, Fisher Scientific) was used to verify hydrogen-bonds were present at ether oxygens of PEG when silica was present. The SiO$_2$ NPs and PEG5k were first mixed at a mass ratio of 1:4 in water and kept overnight before drying the solution to make a powder. Then, the sample powder was ground together with Potassium Bromide (KBr, International Crystal Laboratories) and made into a thin film. The measurements were done under transmission mode. PEG5k was selected rather than other types of PEGs because it is a fine powder which is more suitable for this test. As control experiments, pure PEG5k and SiO$_2$ NPs powders were characterized following the same procedure. (See. FIG. 20)

In light of the foregoing, it should be appreciated that the present invention significantly advances the art by providing a supraparticle that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A supraparticle for use in producing structural colors comprising:
    a plurality of core/shell nanoparticles having a melanin or synthetic melanin core and a silica shell, said silica shell having an outer surface comprising a plurality of silanol groups; and
    a poly(ethylene glycol) (PEG) crosslinker;
    wherein said core/shell nanoparticles are assembled to form a supraparticle having a structure and wherein the mechanical, solution phase, and dry state stability of said structure is reinforced by hydrogen bonds formed between the silanol groups of said plurality of core/shell nanoparticles and said poly(ethylene glycol) crosslinker.

2. The supraparticle of claim 1, wherein said plurality of core/shell nanoparticles having a diameter of from about 3 nm to about 1500 nm.

3. The supraparticle of claim 1, wherein said plurality of core/shell nanoparticles has a synthetic melanin core.

4. The supraparticle of claim 1, wherein core/shell nanoparticles have a synthetic melanin core having a diameter from about 50 nm to about 700 nm and a silica shell having a diameter from about 1 nm to about 120 nm.

5. The supraparticle of claim 1 wherein, said poly(ethylene glycol) crosslinker comprises a linear, branched, or star PEG polymer.

6. The supraparticle of claim 1 wherein, said poly(ethylene glycol) crosslinker has a number average molecular weight ($M_n$) of from about 1000 Da to 10,000 Da.

7. The supraparticle of claim 1 wherein, said poly(ethylene glycol) crosslinker is a 4-arm PEG polymer having a $M_n$ of from about 1000 Da to 10,000 Da.

8. The supraparticle of claim 1 having a diameter of from about 3 µm to about 500 µm.

9. The supraparticle of claim 1 having improved mechanical stability when compared to corresponding supraparticles that do not comprise a poly(ethylene glycol) (PEG) crosslinker.

10. The supraparticle of claim 9 having improved resistance to compressive force when compared to corresponding supraparticles that do not comprise a poly(ethylene glycol) (PEG) crosslinker.

11. The supraparticle of claim 1 having improved solution phase stability when compared to corresponding supraparticles that do not comprise a poly(ethylene glycol) (PEG) crosslinker.

12. The supraparticle of claim 1 having improved dry state stability when deposited on a surface when compared to corresponding supraparticles that do not comprise a poly(ethylene glycol) (PEG) crosslinker when deposited on a corresponding surface.

13. A method of making the supraparticle for use in producing structural colors of claim 1 comprising:
    A) forming a plurality of core/shell nanoparticles having a melanin or synthetic melanin core and a silica shell, said silica shell having an outer surface comprising a plurality of silanol groups and suspending them in water or an aqueous solution;
    B) adding the aqueous suspension of step A to an excess of a non-polar solvent or solvent solution and agitating to form a water-in-oil emulsion with the aqueous suspension of step A in an inner phase and the non-polar solvent or solvent solution forming an outer phase, wherein the core/shell nanoparticles in said inner phase will assemble to form supraparticles;
    C) dissolving a poly(ethylene glycol) crosslinker in a suitable solvent;
    D) collecting the supraparticles formed in step B, adding the poly(ethylene glycol) crosslinker solution of step C to said collected supraparticles, and incubating the mixture for from 1 to 24 hours, whereby hydrogen bonds are formed between the ether groups in the poly(ethylene glycol) crosslinker and the silanol groups on said core/shell nanoparticles to produce the supraparticles.

14. The method of claim 13 further comprising:
E) collecting and washing the supraparticles of step D in alcohol-based solvent to remove any unbound poly(ethylene glycol) crosslinker.

15. The method of claim 13 wherein said plurality of core/shell nanoparticles in step A have a mean diameter of from about 3 nm to about 1500 nm at their widest point.

16. The method of claim 13 wherein said plurality of core/shell nanoparticles in step A have a mean diameter of from about 50 nm to about 700 nm at their widest point.

17. The method of claim 13 wherein said plurality of core/shell nanoparticles in step A have a synthetic melanin core having a diameter from about 30 nm to about 700 nm and a silica shell having a diameter from about 1 nm to about 120 nm.

18. The method of claim 13 wherein the non-polar solvent or solvent solution in step B is an amphiphilic long chain alcohol.

19. The method of claim 13 wherein said poly(ethylene glycol) crosslinker is a linear, branched or star shaped poly(ethylene glycol) polymer having a number average molecular weight ($M_n$) of from about 1000 Da to 10,000 Da.

20. The method of claim 13 wherein poly(ethylene glycol) crosslinker is a 4-arm poly(ethylene glycol) polymer having a $M_n$ of from about 1000 Da to 10,000 Da.

21. The method of claim 13 wherein the poly(ethylene glycol) crosslinker is added to the supraparticles in step D at a mass ratio of poly(ethylene glycol) crosslinker to supraparticles of from about 4:15 to about 1:1.

22. The method of claim 13 wherein the poly(ethylene glycol) crosslinker is added to the supraparticles in step D at a mass ratio of poly(ethylene glycol) crosslinker to supraparticles of about 4:9.

23. A colored ink or paint comprising the supraparticle of claim 1.

* * * * *